US012603095B2

(12) United States Patent
Ding et al.

(10) Patent No.: US 12,603,095 B2
(45) Date of Patent: Apr. 14, 2026

(54) STEREO AUDIO SIGNAL DELAY ESTIMATION METHOD AND APPARATUS

(71) Applicant: Huawei Technologies Co., Ltd., Shenzhen (CN)

(72) Inventors: Jiance Ding, Beijing (CN); Zhe Wang, Beijing (CN); Bin Wang, Shenzhen (CN); Bingyin Xia, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 493 days.

(21) Appl. No.: 18/154,549

(22) Filed: Jan. 13, 2023

(65) Prior Publication Data

US 2023/0154483 A1 May 18, 2023

Related U.S. Application Data

(63) Continuation of application No. PCT/CN2021/106515, filed on Jul. 15, 2021.

(30) Foreign Application Priority Data

Jul. 17, 2020 (CN) ........................ 202010700806.7

(51) Int. Cl.
*G10L 21/0232* (2013.01)
*G10L 25/84* (2013.01)
(Continued)

(52) U.S. Cl.
CPC .......... *G10L 21/0232* (2013.01); *G10L 25/84* (2013.01); *G10L 25/87* (2013.01); *H04S 7/307* (2013.01)

(58) Field of Classification Search
CPC ..... G10L 21/00; G10L 21/0232; G10L 25/00; G10L 25/84; G10L 25/87; H04S 7/00; H04S 7/307
See application file for complete search history.

(56) References Cited

U.S. PATENT DOCUMENTS

2004/0190730 A1* 9/2004 Rui ........................ H04R 3/005 381/91
2008/0159559 A1 7/2008 Akagi et al.
(Continued)

FOREIGN PATENT DOCUMENTS

| | | | |
|---|---|---|---|
| JP | 2010250152 | A | 11/2010 |
| JP | 2013097273 | A | 5/2013 |
| WO | 2019193070 | A1 | 10/2019 |

OTHER PUBLICATIONS

J. R. Villavicencio and L. A. Marquez, "Experimental comparison of correlation methods for time-delay estimation," (ICEEE). 1st International Conference on Electrical and Electronics Engineering, 2004., Acapulco, Mexico, 2004, pp. 433-438, doi: 10.1109/ICEEE.2004.1433921. (Year: 2004).*

*Primary Examiner* — Sean E Serraguard
(74) *Attorney, Agent, or Firm* — Conley Rose, P.C.

(57) ABSTRACT

A stereo audio signal delay estimation method includes obtaining a current frame of a stereo audio signal. The current frame includes a first channel audio signal and a second channel audio signal. Estimating an inter-channel time (ITD) of the current frame using a first algorithm when a signal type of a noise signal included in the current frame is a coherent noise signal type, or estimating the ITD using a second algorithm when the signal type of the noise signal is a diffuse noise signal type. The first algorithm includes weighting a frequency domain cross power spectrum based on a first weighting function that includes a first construction factor. The second algorithm includes weighting the frequency domain cross power spectrum based on a second weighting function that includes a second construction factor different from the first construction factor.

27 Claims, 6 Drawing Sheets

(51) Int. Cl.
*G10L 25/87* (2013.01)
*H04S 7/00* (2006.01)

(56) References Cited

U.S. PATENT DOCUMENTS

| | | | | |
|---|---|---|---|---|
| 2010/0150375 | A1* | 6/2010 | Buck | G10L 25/78 381/94.1 |
| 2012/0016632 | A1 | 1/2012 | Wu et al. | |
| 2013/0343558 | A1* | 12/2013 | Fox | G10L 21/0208 381/71.14 |
| 2017/0270934 | A1 | 9/2017 | Atti et al. | |
| 2021/0012784 | A1* | 1/2021 | Fotopoulou | G10L 19/008 |
| 2021/0098007 | A1* | 4/2021 | Büthe | G10L 19/06 |

* cited by examiner

STEREO AUDIO SIGNAL DELAY ESTIMATION METHOD AND APPARATUS

CROSS-REFERENCE TO RELATED APPLICATIONS

This application is a continuation of International Patent Application No. PCT/CN2021/106515, filed on Jul. 15, 2021, which claims priority to Chinese Patent Application No. 202010700806.7, filed on Jul. 17, 2020. The disclosures of the aforementioned applications are hereby incorporated by reference in their entireties.

TECHNICAL FIELD

The present disclosure relates to the field of audio encoding and decoding, and in particular, to a stereo audio signal delay estimation method and apparatus.

BACKGROUND

In a daily audio and video communication system, people pursue not only high-quality images, but also high-quality audio. In a voice and audio communication system, single-channel audio is increasingly unable to meet people's demands. Meanwhile, stereo audio carries location information of each sound source. This improves definition, intelligibility, and sense of reality of the audio. Therefore, stereo audio is increasingly popular among people.

In a stereo audio encoding and decoding technology, a parametric stereo encoding and decoding technology is a common audio encoding and decoding technology. Common spatial parameters include inter-channel coherence (ICC), inter-channel level difference (ILD), inter-channel time difference (ITD), inter-channel phase difference (IPD), and the like. The ILD and ITD contain location information of a sound source, and accurate estimation of the ILD and ITD information is essential for reconstructing a sound image and sound field of an encoded stereo.

At present, most commonly used ITD estimation methods are generalized cross-correlation methods because such algorithms have low complexity, good real-time performance, easy implementation, and are not dependent on other prior information of stereo audio signals. However, in a noisy environment, performance of several existing generalized cross-correlation algorithms severely deteriorates, resulting in low ITD estimation precision of a stereo audio signal. As a result, problems such as sound image inaccuracy, instability, poor sense of space, and obvious in-head effect occur in a decoded stereo audio signal in the parametric encoding and decoding technology, greatly affecting sound quality of an encoded stereo audio signal.

SUMMARY

The present disclosure provides a stereo audio signal delay estimation method and apparatus to improve inter-channel time difference estimation precision of a stereo audio signal, improve accuracy and stability of a sound image of a decoded stereo audio signal, and improve sound quality.

According to a first aspect, this application provides a stereo audio signal delay estimation method. The method may be applied to an audio coding apparatus. The audio coding apparatus may be applied to an audio coding part in a stereo and multi-channel audio and video communication system, or may be applied to an audio coding part in a virtual reality (VR) application program. The method may include: an audio coding apparatus obtains a current frame of a stereo audio signal, where the current frame includes a first channel audio signal and a second channel audio signal; and if a signal type of a noise signal included in the current frame is a coherent noise signal type, estimates an ITD between the first channel audio signal and the second channel audio signal by using a first algorithm; or if a signal type of a noise signal included in the current frame is a diffuse noise signal type, estimates the ITD between the first channel audio signal and the second channel audio signal by using a second algorithm. The first algorithm includes weighting a frequency domain cross power spectrum of the current frame based on a first weighting function, the second algorithm includes weighting a frequency domain cross power spectrum of the current frame based on a second weighting function, and a construction factor of the first weighting function is different from that of the second weighting function.

The stereo audio signal may be a raw stereo audio signal (including a left channel audio signal and a right channel audio signal), or may be a stereo audio signal formed by two audio signals in a multi-channel audio signal, or may be a stereo signal formed by two audio signals generated by combining a plurality of audio signals in a multi-channel audio signal. Certainly, the stereo audio signal may alternatively be in another form. This is not specifically limited in this embodiment of this application.

Optionally, the audio coding apparatus may specifically be a stereo coding apparatus. The apparatus may constitute an independent stereo coder; or may be a core coding part of a multi-channel coder, to encode a stereo audio signal formed by two audio signals generated by combining a plurality of signals in a multi-channel audio signal.

In some possible implementations, the current frame of the stereo signal obtained by the audio coding apparatus may be a frequency domain audio signal or a time domain audio signal. If the current frame is a frequency domain audio signal, the audio coding apparatus may directly process the current frame in frequency domain. If the current frame is a time domain audio signal, the audio coding apparatus may first perform time-frequency transform on the current frame in time domain to obtain a current frame in frequency domain, and then process the current frame in frequency domain.

In this application, the audio coding apparatus uses different ITD estimation algorithms for stereo audio signals including different types of noise, greatly improving ITD estimation precision and stability of a stereo audio signal in a case of diffuse noise and coherent noise, reducing inter-frame discontinuity between stereo downmixed signals, and better maintaining a phase of the stereo signal. A sound image of an encoded stereo is more accurate and stable, and has a stronger sense of reality, and auditory quality of the encoded stereo signal is improved.

In some possible implementations, after the current frame of the stereo audio signal is obtained, the method further includes: obtaining a noise coherence value of the current frame; and if the noise coherence value is greater than or equal to a preset threshold, determining that the signal type of the noise signal included in the current frame is a coherent noise signal type; or if the noise coherence value is less than a preset threshold, determining that the signal type of the noise signal included in the current frame is a diffuse noise signal type.

Optionally, the preset threshold is an empirical value, and may be set to 0.20, 0.25, 0.30, or the like.

In some possible implementations, the obtaining a noise coherence value of the current frame may include: performing speech endpoint detection on the current frame; and if a detection result indicates that a signal type of the current frame is a noise signal type, calculating the noise coherence value of the current frame; or if a detection result indicates that a signal type of the current frame is a speech signal type, determining a noise coherence value of a previous frame of the current frame of the stereo audio signal as the noise coherence value of the current frame.

Optionally, the audio coding apparatus may calculate a speech endpoint detection value in time domain, frequency domain, or a combination of time domain and frequency domain. This is not specifically limited herein.

In this application, after calculating the noise coherence value of the current frame, the audio coding apparatus may further perform smoothing processing on the noise coherence value, to reduce an error in estimating the noise coherence value and improve accuracy of noise type identifying.

In some possible implementations, the first channel audio signal is a first channel time domain signal, and the second channel audio signal is a second channel time domain signal. Estimating the inter-channel time difference between the first channel audio signal and the second channel audio signal by using the first algorithm includes: performing time-frequency transform on the first channel time domain signal and the second channel time domain signal, to obtain a first channel frequency domain signal and a second channel frequency domain signal; calculating the frequency domain cross power spectrum of the current frame based on the first channel frequency domain signal and the second channel frequency domain signal; weighting the frequency domain cross power spectrum based on the first weighting function; and obtaining an estimated value of the inter-channel time difference based on a weighted frequency domain cross power spectrum. The construction factor of the first weighting function includes: a Wiener gain factor corresponding to the first channel frequency domain signal, a Wiener gain factor corresponding to the second channel frequency domain signal, an amplitude weighting parameter, and a squared coherence value of the current frame.

In some possible implementations, the first channel audio signal is a first channel frequency domain signal, and the second channel audio signal is a second channel frequency domain signal. Estimating the inter-channel time difference between the first channel audio signal and the second channel audio signal by using the first algorithm includes: calculating the frequency domain cross power spectrum of the current frame based on the first channel frequency domain signal and the second channel frequency domain signal; weighting the frequency domain cross power spectrum based on the first weighting function; and obtaining an estimated value of the inter-channel time difference based on a weighted frequency domain cross power spectrum. The construction factor of the first weighting function includes: a Wiener gain factor corresponding to the first channel frequency domain signal, a Wiener gain factor corresponding to the second channel frequency domain signal, an amplitude weighting parameter, and a squared coherence value of the current frame.

In some possible implementations, the first weighting function $\Phi_{new\_1}(k)$ satisfies the following formula:

$$\Phi_{new\_1}(k) = \frac{W_{x1}(k)W_{x2}(k)}{|X_1(k)X_2^*(k)|^\beta} \times \frac{\Gamma^2(k)}{(1.0 - \Gamma^2(k))}.$$

$\beta$ is the amplitude weighting parameter, $W_{x1}(k)$ is the Wiener gain factor corresponding to the first channel frequency domain signal, $W_{x2}(k)$ is the Wiener gain factor corresponding to the second channel frequency domain signal, $\Gamma^2(k)$ is a squared coherence value of a $k^{th}$ frequency bin of the current frame, $$\Gamma^2(k) = \frac{|X_1(k)X_2^*(k)|^2}{|X_1(k)|^2|X_2(k)|^2},$$

$X_1(k)$ is the first channel frequency domain signal, $X_2(k)$ is the second channel frequency domain signal, $X_2^*(k)$ is a conjugate function of $X_2(k)$, k is a frequency bin index value, k=0, 1, . . . , $N_{DFT}-1$, and $N_{DFT}$ is a total quantity of frequency bins of the current frame after time-frequency transform.

In some possible implementations, the first weighting function $\Phi_{new\_1}(k)$ satisfies the following formula:

$$\Phi_{new\_1}(k) = \frac{W_{x1}(k)W_{x2}(k)}{|X_1(k)X_2^*(k)|^\beta} \times \Gamma^2(k).$$

$\beta$ is the amplitude weighting parameter, $W_{x1}(k)$ is the Wiener gain factor corresponding to the first channel frequency domain signal, $W_{x2}(k)$ is the Wiener gain factor corresponding to the second channel frequency domain signal, $\Gamma^2(k)$ is a squared coherence value of a $k^{th}$ frequency bin of the current frame, $$\Gamma^2(k) = \frac{|X_1(k)X_2^*(k)|^2}{|X_1(k)|^2|X_2(k)|^2},$$

$X_1(k)$ is the first channel frequency domain signal, $X_2(k)$ is the second channel frequency domain signal, $X_2^*(k)$ is a conjugate function of $X_2(k)$, k is a frequency bin index value, k=0, 1, . . . , $N_{DFT}-1$, and $N_{DFT}$ is a total quantity of frequency bins of the current frame after time-frequency transform.

Optionally, $\beta \in [0,1]$, for example, $\beta$=0.6, 0.7, or 0.8.

In some possible implementations, the Wiener gain factor corresponding to the first channel frequency domain signal may be a first initial Wiener gain factor and/or a first improved Wiener gain factor of the first channel frequency domain signal. The Wiener gain factor corresponding to the second channel frequency domain signal may be a second initial Wiener gain factor and/or a second improved Wiener gain factor of the second channel frequency domain signal.

For example, the Wiener gain factor corresponding to the first channel frequency domain signal is a first initial Wiener gain factor of the first channel frequency domain signal, and the Wiener gain factor corresponding to the second channel frequency domain signal is a second initial Wiener gain factor of the second channel frequency domain signal. In this case, after the current frame of the stereo audio signal is obtained, the method further includes: obtaining an estimated value of a first channel noise power spectrum based on the first channel frequency domain signal, determining the first initial Wiener gain factor based on the estimated value of the first channel noise power spectrum; obtaining an estimated value of a second channel noise power spectrum based on the second channel frequency domain signal; and determining the second initial Wiener gain factor based on the estimated value of the second channel noise power spectrum.

In this application, after the Wiener gain factor weighting, a weight of a coherent noise component in the frequency domain cross power spectrum of the stereo audio signal is greatly reduced, and correlation of residual noise components is also greatly reduced. In most cases, a squared coherence value of the residual noise is much smaller than a squared coherence value of a target signal (for example, a speech signal) in the stereo audio signal. In this way, a cross-correlation peak value corresponding to the target signal is more prominent, and ITD estimation precision and stability of the stereo audio signal will be greatly improved.

In some possible implementations, the first initial Wiener gain factor $W_{x1}^{A}(k)$ satisfies the following formula:

$$W_{x1}^{A}(k) = \frac{|X_1(k)|^2 - |\hat{N}_1(k)|^2}{|X_1(k)|^2}.$$

The second initial Wiener gain factor $W_{x2}^{A}(k)$ satisfies the following formula:

$$W_{x2}^{A}(k) = \frac{|X_2(k)|^2 - |\hat{N}_2(k)|^2}{|X_2(k)|^2}.$$

$|\hat{N}_1(k)|^2$ is the estimated value of the first channel noise power spectrum, $|\hat{N}_2(k)|^2$ is the estimated value of the second channel noise power spectrum, $X_1(k)$ is the first channel frequency domain signal, $X_2(k)$ is the second channel frequency domain signal, k is the frequency bin index value, k=0, 1, . . . , $N_{DFT}-1$, and $N_{DFT}$ is a total quantity of frequency bins of the current frame after time-frequency transform.

For another example, the Wiener gain factor corresponding to the first channel frequency domain signal is a first improved Wiener gain factor of the first channel frequency domain signal, and the Wiener gain factor corresponding to the second channel frequency domain signal is a second improved Wiener gain factor of the second channel frequency domain signal.

After the current frame of the stereo audio signal is obtained, the method further includes: obtaining the first initial Wiener gain factor and the second initial Wiener gain factor; constructing a binary masking function for the first initial Wiener gain factor, to obtain the first improved Wiener gain factor; and constructing a binary masking function for the second initial Wiener gain factor, to obtain the second improved Wiener gain factor.

In this application, a binary masking function is constructed for the first initial Wiener gain factor corresponding to the first channel frequency domain signal and the second initial Wiener gain factor corresponding to the second channel frequency domain signal, so that frequency bins less affected by noise are selected, improving ITD estimation precision.

In some possible implementations, the first improved Wiener gain factor $W_{x1}^{B}(k)$ satisfies the following formula:

$$W_{x1}^{B}(k) = \begin{cases} 1 & \text{if } W_{x1}^{A}(k) \geq \mu_0 \\ 0 & \text{if } W_{x1}^{A}(k) < \mu_0 \end{cases}.$$

The second improved Wiener gain factor $$W_{x2}^{B}(k)$$

x1 satisfies the following formula:

$$W_{x2}^{B}(k) = \begin{cases} 1 & \text{if } W_{x2}^{A}(k) \geq \mu_0 \\ 0 & \text{if } W_{x2}^{A}(k) < \mu_0 \end{cases}.$$

$\mu_0$ is a binary masking threshold of the Wiener gain factor, $W_{x1}^{A}(k)$ is the first initial Wiener gain factor, and $W_{x2}^{A}(k)$ is the second initial Wiener gain factor.

Optionally, $\mu_0 \in [0.5, 0.8]$, for example, $\mu_0$=0.5, 0.66, 0.75, or 0.8.

In some possible implementations, the first channel audio signal is a first channel time domain signal, and the second channel audio signal is a second channel time domain signal. Estimating the inter-channel time difference between the first channel frequency domain signal and the second channel frequency domain signal by using the second algorithm includes: performing time-frequency transform on the first channel time domain signal and the second channel time domain signal, to obtain a first channel frequency domain signal and a second channel frequency domain signal; calculating the frequency domain cross power spectrum of the current frame based on the first channel frequency domain signal and the second channel frequency domain signal; and weighting the frequency domain cross power spectrum based on the second weighting function, to obtain an estimated value of the inter-channel time difference between the first channel frequency domain signal and the second channel frequency domain signal. The construction factor of the second weighting function includes an amplitude weighting parameter and a squared coherence value of the current frame.

In some possible implementations, the first channel audio signal is a first channel frequency domain signal, and the second channel audio signal is a second channel frequency domain signal. Estimating the inter-channel time difference between the first channel audio signal and the second channel audio signal by using the second algorithm includes: calculating the frequency domain cross power spectrum of the current frame based on the first channel frequency domain signal and the second channel frequency domain signal; weighting the frequency domain cross power spectrum based on the second weighting function; and obtaining an estimated value of the inter-channel time difference based on a weighted frequency domain cross power spectrum. The construction factor of the second weighting function includes an amplitude weighting parameter and a squared coherence value of the current frame.

In some possible implementations, the second weighting function $\Phi_{new\_2}(k)$ satisfies the following formula:

$$\Phi_{new\_2}(k) = \frac{1}{|X_1(k)X_2^*(k)|^{\beta}} \times \Gamma^2(k).$$

$\beta$ is the amplitude weighting parameter, $\Gamma^2(k)$ is a squared coherence value of a $k^{th}$ frequency bin of the current frame, $$\Gamma^2(k) = \frac{|X_1(k)X_2^*(k)|^2}{|X_1(k)|^2|X_2(k)|^2},$$

$X_1(k)$ is the first channel frequency domain signal, $X_2(k)$ is the second channel frequency domain signal, $X_2^*(k)$ is a conjugate function of $X_2(k)$, k is the frequency bin index value, k=0, 1, . . . , $N_{DFT}-1$, and $N_{DFT}$ is a total quantity of frequency bins of the current frame after time-frequency transform.

Optionally, $\beta \in [0,1]$, for example, $\beta$=0.6, 0.7, or 0.8.

According to a second aspect, this application provides a stereo audio signal delay estimation method. The method may be applied to an audio coding apparatus. The audio coding apparatus may be applied to an audio coding part in a stereo and multi-channel audio and video communication system, or may be applied to an audio coding part in a VR application program. The method may include: a current frame includes a first channel audio signal and a second channel audio signal; calculating a frequency domain cross power spectrum of the current frame based on the first channel audio signal and the second channel audio signal; weighting the frequency domain cross power spectrum based on a preset weighting function; and obtaining an estimated value of an inter-channel time difference between a first channel frequency domain signal and a second channel frequency domain signal based on a weighted frequency domain cross power spectrum.

The preset weighting function includes a first weighting function or a second weighting function, and a construction factor of the first weighting function is different from that of the second weighting function.

Optionally, the construction factor of the first weighting function includes: a Wiener gain factor corresponding to the first channel frequency domain signal, a Wiener gain corresponding to the second channel frequency domain signal, an amplitude weighting parameter, and a squared coherence value of the current frame. The construction factor of the second weighting function includes: an amplitude weighting parameter and a squared coherence value of the current frame.

In some possible implementations, the first channel audio signal is a first channel time domain signal, and the second channel audio signal is a second channel time domain signal. Calculating the frequency domain cross power spectrum of the current frame based on the first channel audio signal and the second channel audio signal includes: performing time-frequency transform on the first channel time domain signal and the second channel time domain signal, to obtain a first channel frequency domain signal and a second channel frequency domain signal; and calculating the frequency domain cross power spectrum of the current frame based on the first channel frequency domain signal and the second channel frequency domain signal.

In some possible implementations, the first channel audio signal is a first channel frequency domain signal, and the second channel audio signal is a second channel frequency domain signal.

In some possible implementations, the first weighting function $\Phi_{new\_1}(k)$ satisfies the following formula:

$$\Phi_{new\_1}(k) = \frac{W_{x1}(k)W_{x2}(k)}{|X_1(k)X_2^*(k)|^{\beta}} \times \frac{\Gamma^2(k)}{(1.0 - \Gamma^2(k))}.$$

$\beta$ is the amplitude weighting parameter, $W_{x1}(k)$ is the Wiener gain factor corresponding to the first channel frequency domain signal, $W_{x2}(k)$ is the Wiener gain factor corresponding to the second channel frequency domain signal, $\Gamma^2(k)$ is a squared coherence value of a $k^{th}$ frequency bin of the current frame, $$\Gamma^2(k) = \frac{|X_1(k)X_2^*(k)|^2}{|X_1(k)|^2|X_2(k)|^2},$$

$X_1(k)$ is the first channel frequency domain signal, $X_2(k)$ is the second channel frequency domain signal, $X_2^*(k)$ is a conjugate function of $X_2(k)$, k is a frequency bin index value, k=0, 1, . . . , $N_{DFT}-1$, and $N_{DFT}$ is a total quantity of frequency bins of the current frame after time-frequency transform.

In some possible implementations, the first weighting function $\Phi_{new\_1}(k)$ satisfies the following formula:

$$\Phi_{new\_1}(k) = \frac{W_{x1}(k)W_{x2}(k)}{|X_1(k)X_2^*(k)|^{\beta}} \times \Gamma^2(k).$$

$\beta$ is the amplitude weighting parameter, $W_{x1}$ (k) is the Wiener gain factor corresponding to the first channel frequency domain signal, $W_{x2}$ (k) is the Wiener gain factor corresponding to the second channel frequency domain signal, $\Gamma^2(k)$ is a squared coherence value of a $k^{th}$ frequency bin of the current frame, $$\Gamma^2(k) = \frac{|X_1(k)X_2^*(k)|^2}{|X_1(k)|^2|X_2(k)|^2},$$

$X_1(k)$ is the first channel frequency domain signal, $X_2(k)$ is the second channel frequency domain signal, $X_2^*(k)$ is a conjugate function of $X_2(k)$, k is a frequency bin index value, k=0, 1, . . . , $N_{DFT}-1$, and $N_{DFT}$ is a total quantity of frequency bins of the current frame after time-frequency transform.

Optionally, $\beta \in [0,1]$, for example, $\beta$=0.6, 0.7, or 0.8.

In some possible implementations, the Wiener gain factor corresponding to the first channel frequency domain signal may be a first initial Wiener gain factor and/or a first improved Wiener gain factor of the first channel frequency domain signal. The Wiener gain factor corresponding to the second channel frequency domain signal may be a second initial Wiener gain factor and/or a second improved Wiener gain factor of the second channel frequency domain signal.

For example, the Wiener gain factor corresponding to the first channel frequency domain signal is a first initial Wiener gain factor of the first channel frequency domain signal, and the Wiener gain factor corresponding to the second channel frequency domain signal is a second initial Wiener gain factor of the second channel frequency domain signal. After the current frame of the stereo audio signal is obtained, the method further includes: obtaining an estimated value of a first channel noise power spectrum based on the first channel frequency domain signal, determining the first initial Wiener gain factor based on the estimated value of the first channel noise power spectrum; obtaining an estimated value of a second channel noise power spectrum based on the second channel frequency domain signal; and determining the second initial Wiener gain factor based on the estimated value of the second channel noise power spectrum.

In some possible implementations, the first initial Wiener gain factor $W_{x1}^{A}(k)$ satisfies the following formula:

$$W_{x1}^{A}(k) = \frac{|X_1(k)|^2 - |\hat{N}_1(k)|^2}{|X_1(k)|^2}.$$

The second initial Wiener gain factor $W_{x2}^{A}(k)$ satisfies the following formula:

$$W_{x2}^{A}(k) = \frac{|X_2(k)|^2 - |\hat{N}_2(k)|^2}{|X_2(k)|^2}.$$

$|\hat{N}_1(k)|^2$ is the estimated value of the first channel noise power spectrum, $|\hat{N}_2(k)|^2$ is the estimated value of the second channel noise power spectrum, $X_1(k)$ is the first channel frequency domain signal, $X_2(k)$ is the second channel frequency domain signal, k is the frequency bin index value, k=0, 1, . . . , $N_{DFT}-1$, and $N_{DFT}$ is a total quantity of frequency bins of the current frame after time-frequency transform.

For another example, the Wiener gain factor corresponding to the first channel frequency domain signal is a first improved Wiener gain factor of the first channel frequency domain signal, and the Wiener gain factor corresponding to the second channel frequency domain signal is a second improved Wiener gain factor of the second channel frequency domain signal. After the current frame of the stereo audio signal is obtained, the method further includes: obtaining the first initial Wiener gain factor and the second initial Wiener gain factor; constructing a binary masking function for the first initial Wiener gain factor, to obtain the first improved Wiener gain factor; and constructing a binary masking function for the second initial Wiener gain factor, to obtain the second improved Wiener gain factor.

In some possible implementations, the first improved Wiener gain factor $W_{x1}^{B}(k)$ satisfies the following formula:

$$W_{x1}^{B}(k) = \begin{cases} 1 & \text{if } W_{x1}^{A}(k) \geq \mu_0 \\ 0 & \text{if } W_{x1}^{A}(k) < \mu_0 \end{cases}.$$

The second improved Wiener gain factor $$\underset{x1}{W_{x2}^{B}(k)}$$

satisfies the following formula:

$$W_{x2}^{B}(k) = \begin{cases} 1 & \text{if } W_{x2}^{A}(k) \geq \mu_0 \\ 0 & \text{if } W_{x2}^{A}(k) < \mu_0 \end{cases}.$$

$\mu_0$ is a binary masking threshold of the Wiener gain factor, $W_{x1}^{A}(k)$ is the first Wiener gain factor, and $W_{x2}^{A}(k)$ is the second Wiener gain factor.

Optionally, $\mu_0 \in [0.5, 0.8]$, for example, $\mu_0$=0.5, 0.66, 0.75, or 0.8.

In some possible implementations, the second weighting function $\Phi_{new\_2}(k)$ satisfies the following formula:

$$\Phi_{new\_2}(k) = \frac{1}{|X_1(k)X_2^*(k)|^{\beta}}\Gamma^2(k).$$

$\beta$ is the amplitude weighting parameter, $\Gamma^2(k)$ is a squared coherence value of a $k^{th}$ frequency bin of the current frame, $$\Gamma^2(k) = \frac{|X_1(k)X_2^*(k)|^2}{|X_1(k)|^2|X_2(k)|^2},$$

$X_1(k)$ is the first channel frequency domain signal, $X_2(k)$ is the second channel frequency domain signal, $X_2^*(k)$ is a conjugate function of $X_2(k)$, k is a frequency bin index value, k=0, 1, . . . , $N_{DFT}-1$, and $N_{DFT}$ is a total quantity of frequency bins of the current frame after time-frequency transform.

Optionally, $\beta \in [0,1]$, for example, $\beta$=0.6, 0.7, or 0.8.

According to a third aspect, this application provides a stereo audio signal delay estimation apparatus. The apparatus may be a chip or a system on chip in an audio coding apparatus, or may be a functional module that is in the audio coding apparatus and that is configured to implement the method according to any one of the first aspect or the possible implementations of the first aspect. For example, the stereo audio signal delay estimation apparatus includes: a first obtaining module configured to obtain a current frame of a stereo audio signal, where the current frame includes a first channel audio signal and a second channel audio signal; and a first inter-channel time difference estimation module configured to: if a signal type of a noise signal included in the current frame is a coherent noise signal type, estimate an inter-channel time difference between the first channel audio signal and the second channel audio signal by using a first algorithm; or if a signal type of a noise signal included in the current frame is a diffuse noise signal type, estimate an inter-channel time difference between the first channel audio signal and the second channel audio signal by using a second algorithm. The first algorithm includes weighting a frequency domain cross power spectrum of the current frame based on a first weighting function, and the second algorithm includes weighting a frequency domain cross power spectrum of the current frame based on a second weighting function, and a construction factor of the first weighting function is different from that of the second weighting function.

In some possible implementations, the apparatus further includes: a noise coherence value calculation module configured to: obtain a noise coherence value of the current frame after the first obtaining module obtains the current frame; and if the noise coherence value is greater than or equal to a preset threshold, determine that the signal type of the noise signal included in the current frame is a coherent noise signal type; or if the noise coherence value is less than a preset threshold, determine that the signal type of the noise signal included in the current frame is a diffuse noise signal type.

In some possible implementations, the apparatus further includes: a speech endpoint detection module configured to perform speech endpoint detection on the current frame. The noise coherence value calculation module is further configured to: if a detection result indicates that a signal type of the current frame is a noise signal type, calculate the noise coherence value of the current frame; or if a detection result indicates that a signal type of the current frame is a speech signal type, determine a noise coherence value of a previous frame of the current frame of the stereo audio signal as the noise coherence value of the current frame.

In this application, the speech endpoint detection module may calculate a speech endpoint detection value in time domain, frequency domain, or a combination of time domain and frequency domain. This is not specifically limited herein.

In some possible implementations, the first channel audio signal is a first channel time domain signal, and the second channel audio signal is a second channel time domain signal. The first inter-channel time difference estimation module is configured to: perform time-frequency transform on the first channel time domain signal and the second channel time domain signal, to obtain a first channel frequency domain signal and a second channel frequency domain signal; calculate the frequency domain cross power spectrum of the current frame based on the first channel frequency domain signal and the second channel frequency domain signal; weight the frequency domain cross power spectrum based on the first weighting function; and obtain an estimated value of the inter-channel time difference based on a weighted frequency domain cross power spectrum. The construction factor of the first weighting function includes: a Wiener gain factor corresponding to the first channel frequency domain signal, a Wiener gain factor corresponding to the second channel frequency domain signal, an amplitude weighting parameter, and a squared coherence value of the current frame.

In some possible implementations, the first channel audio signal is a first channel frequency domain signal, and the second channel audio signal is a second channel frequency domain signal. The first inter-channel time difference estimation module is configured to: calculate the frequency domain cross power spectrum of the current frame based on the first channel frequency domain signal and the second channel frequency domain signal; weight the frequency domain cross power spectrum based on the first weighting function; and obtain an estimated value of the inter-channel time difference based on a weighted frequency domain cross power spectrum. The construction factor of the first weighting function includes: a Wiener gain factor corresponding to the first channel frequency domain signal, a Wiener gain factor corresponding to the second channel frequency domain signal, an amplitude weighting parameter, and a squared coherence value of the current frame.

In some possible implementations, the first weighting function $\Phi_{new\_1}(k)$ satisfies the following formula:

$$\Phi_{new\_1}(k) = \frac{W_{x1}(k)W_{x2}(k)}{|X_1(k)X_2^*(k)|^{\beta}} \times \frac{\Gamma^2(k)}{(1.0 - \Gamma^2(k))}.$$

$\beta$ is the amplitude weighting parameter, $\beta \in [0,1]$, $W_{x1}(k)$ is the Wiener gain factor corresponding to the first channel frequency domain signal, $W_{x2}(k)$ is the Wiener gain factor corresponding to the second channel frequency domain signal; $X_1(k)$ is the first channel frequency domain signal, $X_2(k)$ is the second channel frequency domain signal, $X_2^*(k)$ is a conjugate function of $X_2(k)$, $\Gamma^2(k)$ is a squared coherence value of a $k^{th}$ frequency bin of the current frame, $$\Gamma^2(k) = \frac{|X_1(k)X_2^*(k)|^2}{|X_1(k)|^2|X_2(k)|^2},$$

k is a frequency bin index value, k=0, 1, . . . , $N_{DFT}-1$, and $N_{DFT}$ is a total quantity of frequency bins of the current frame after time-frequency transform.

In some possible implementations, the first weighting function $\Phi_{new\_1}(k)$ satisfies the following formula:

$$\Phi_{new\_1}(k) = \frac{W_{x1}(k)W_{x2}(k)}{|X_1(k)X_2^*(k)|^{\beta}} \times \Gamma^2(k).$$

$\beta$ is the amplitude weighting parameter, $\beta \in [0,1]$, $W_{x1}(k)$ is the Wiener gain factor corresponding to the first channel frequency domain signal, $W_{x2}(k)$ is the Wiener gain factor corresponding to the second channel frequency domain signal; $X_1(k)$ is the first channel frequency domain signal, $X_2(k)$ is the second channel frequency domain signal, $X_2^*(k)$ is a conjugate function of $X_2(k)$, $\Gamma^2(k)$ is a squared coherence value of a $k^{th}$ frequency bin of the current frame, $$\Gamma^2(k) = \frac{|X_1(k)X_2^*(k)|^2}{|X_1(k)|^2|X_2(k)|^2},$$

k is a frequency bin index value, k=0, 1, . . . , $N_{DFT}-1$, and $N_{DFT}$ is a total quantity of frequency bins of the current frame after time-frequency transform.

In some possible implementations, the Wiener gain factor corresponding to the first channel frequency domain signal is a first initial Wiener gain factor of the first channel frequency domain signal, and the Wiener gain factor corresponding to the second channel frequency domain signal is a second initial Wiener gain factor of the second channel frequency domain signal. The first inter-channel time difference estimation module is further configured to: obtain an estimated value of a first channel noise power spectrum based on the first channel frequency domain signal after the first obtaining module obtains the current frame; determine the first initial Wiener gain factor based on the estimated value of the first channel noise power spectrum; obtain an estimated value of a second channel noise power spectrum based on the second channel frequency domain signal; and determine the second initial Wiener gain factor based on the estimated value of the second channel noise power spectrum.

In some possible implementations, the first initial Wiener gain factor $W_{x1}^A(k)$ satisfies the following formula:

$$W_{x1}^A(k) = \frac{|X_1(k)|^2 - |\hat{N}_1(k)|^2}{|X_1(k)|^2}.$$

The second initial Wiener gain factor $W_{x2}^A(k)$ satisfies the following formula:

$$W_{x2}^A(k) = \frac{|X_2(k)|^2 - |\hat{N}_2(k)|^2}{|X_2(k)|^2}.$$

$|\hat{N}_1(k)|^2$ is the estimated value of the first channel noise power spectrum, $|\hat{N}_2(k)|^2$ is the estimated value of the second channel noise power spectrum, $X_1(k)$ is the first channel frequency domain signal, $X_2(k)$ is the second channel frequency domain signal, k is the frequency bin index value, k=0, 1, . . . , $N_{DFT}-1$, and $N_{DFT}$ is a total quantity of frequency bins of the current frame after time-frequency transform.

In some possible implementations, the Wiener gain factor corresponding to the first channel frequency domain signal is a first improved Wiener gain factor of the first channel frequency domain signal, and the Wiener gain factor corresponding to the second channel frequency domain signal is a second improved Wiener gain factor of the second channel frequency domain signal. The first inter-channel time difference estimation module is further configured to: construct a binary masking function for the first initial Wiener gain factor after the first obtaining module obtains the current frame, to obtain the first improved Wiener gain factor; and construct a binary masking function for the second initial Wiener gain factor, to obtain the second improved Wiener gain factor.

In some possible implementations, the first improved Wiener gain factor ${W_{x1}}^{B}(k)$ satisfies the following formula:

$$W_{x1}^{B}(k)=\begin{cases}1 & \text{if } W_{x1}^{A}(k)\geq\mu_0\\ 0 & \text{if } W_{x2}^{A}(k)<\mu_0\end{cases}.$$

The second improved Wiener gain factor $$W_{\substack{x2\\x1}}^{B}(k)$$

satisfies the following formula:

$$W_{x2}^{B}(k)=\begin{cases}1 & \text{if } W_{x2}^{A}(k)\geq\mu_0\\ 0 & \text{if } W_{x2}^{A}(k)<\mu_0\end{cases}.$$

$\mu_0$ is a binary masking threshold of the Wiener gain factor, ${W_{x1}}^{A}(k)$ is the first initial Wiener gain factor, and ${W_{x2}}^{A}(k)$ is the second initial Wiener gain factor.

In some possible implementations, the first channel audio signal is a first channel time domain signal, and the second channel audio signal is a second channel time domain signal. The first inter-channel time difference estimation module is further configured to: perform time-frequency transform on the first channel time domain signal and the second channel time domain signal, to obtain a first channel frequency domain signal and a second channel frequency domain signal; calculate the frequency domain cross power spectrum of the current frame based on the first channel frequency domain signal and the second channel frequency domain signal; weight the frequency domain cross power spectrum based on the second weighting function, to obtain an estimated value of the inter-channel time difference. The construction factor of the second weighting function includes an amplitude weighting parameter and a squared coherence value of the current frame.

In some possible implementations, the first channel audio signal is a first channel frequency domain signal, and the second channel audio signal is a second channel frequency domain signal. The first inter-channel time difference estimation module is further configured to: calculate the frequency domain cross power spectrum of the current frame based on the first channel frequency domain signal and the second channel frequency domain signal; weight the frequency domain cross power spectrum based on the second weighting function; and obtain an estimated value of the inter-channel time difference based on a weighted frequency domain cross power spectrum. The construction factor of the second weighting function includes an amplitude weighting parameter and a squared coherence value of the current frame.

In some possible implementations, the second weighting function $\Phi_{new\_2}(k)$ satisfies the following formula:

$$\Phi_{new\_2}(k)=\frac{1}{|X_1(k)X_2^*(k)|^{\beta}}\times\Gamma^2(k).$$

$\beta$ is the amplitude weighting parameter, $\beta\in[0,1]$, $X_1(k)$ is the first channel frequency domain signal, $X_2(k)$ is the second channel frequency domain signal, $X_2{}^*(k)$ is a conjugate function of $X_2(k)$, $\Gamma^2(k)$ is a squared coherence value of a $k^{th}$ frequency bin of the current frame, $$\Gamma^2(k)=\frac{|X_1(k)X_2^*(k)|^2}{|X_1(k)|^2|X_2(k)|^2},$$

k is the frequency bin index value, k=0, 1, . . . , $N_{DFT}-1$, and $N_{DFT}$ is a total quantity of frequency bins of the current frame after time-frequency transform.

According to a fourth aspect, this application provides a stereo audio signal delay estimation apparatus. The apparatus may be a chip or a system on chip in an audio coding apparatus, or may be a functional module that is in the audio coding apparatus and that is configured to implement the method according to any one of the second aspect or the possible implementations of the second aspect. For example, the stereo audio signal delay estimation apparatus includes: a second obtaining module configured to obtain a current frame of a stereo audio signal, where the current frame includes a first channel audio signal and a second channel audio signal; and a second inter-channel time difference estimation module configured to: calculate a frequency domain cross power spectrum of the current frame based on the first channel audio signal and the second channel audio signal; weight the frequency domain cross power spectrum based on a preset weighting function; and obtain an estimated value of an inter-channel time difference between a first channel frequency domain signal and a second channel frequency domain signal based on a weighted frequency domain cross power spectrum. The preset weighting function is a first weighting function or a second weighting function, and a construction factor of the first weighting function is different from that of the second weighting function. The construction factor of the first weighting function includes: a Wiener gain factor corresponding to the first channel frequency domain signal, a Wiener gain corresponding to the second channel frequency domain signal, an amplitude weighting parameter, and a squared coherence value of the current frame. The construction factor of the second weighting function includes: an amplitude weighting parameter and a squared coherence value of the current frame.

In some possible implementations, the first channel audio signal is a first channel time domain signal, and the second channel audio signal is a second channel time domain signal. The second inter-channel time difference estimation module is configured to: perform time-frequency transform on the first channel time domain signal and the second channel time domain signal, to obtain a first channel frequency domain signal and a second channel frequency domain signal; and calculate the frequency domain cross power spectrum of the current frame based on the first channel frequency domain signal and the second channel frequency domain signal.

In some possible implementations, the first channel audio signal is a first channel frequency domain signal, and the second channel audio signal is a second channel frequency domain signal.

In some possible implementations, the first weighting function $\Phi_{new\_1}(k)$ satisfies the following formula:

$$\Phi_{new\_1}(k) = \frac{W_{x1}(k)W_{x2}(k)}{|X_1(k)X_2^*(k)|^\beta} \times \frac{\Gamma^2(k)}{(1.0 - \Gamma^2(k))}.$$

$\beta$ is the amplitude weighting parameter, $\beta \in [0,1]$, $W_{x1}(k)$ is the Wiener gain factor corresponding to the first channel frequency domain signal, $W_{x2}(k)$ is the Wiener gain factor corresponding to the second channel frequency domain signal; $X_1(k)$ is the first channel frequency domain signal, $X_2(k)$ is the second channel frequency domain signal, $X_2^*(k)$ is a conjugate function of $X_2(k)$, $\Gamma^2(k)$ is a squared coherence value of a $k^{th}$ frequency bin of the current frame, $$\Gamma^2(k) = \frac{|X_1(k)X_2^*(k)|^2}{|X_1(k)|^2|X_2(k)|^2},$$

k is a frequency bin index value, k=0, 1, . . . , $N_{DFT}-1$, and $N_{DFT}$ is a total quantity of frequency bins of the current frame after time-frequency transform.

In some possible implementations, the first weighting function $\Phi_{new\_1}(k)$ satisfies the following formula:

$$\Phi_{new\_1}(k) = \frac{W_{x1}(k)W_{x2}(k)}{|X_1(k)X_2^*(k)|^\beta} \times \Gamma^2(k).$$

$\beta$ is the amplitude weighting parameter, $\beta \in [0,1]$, $W_{x1}(k)$ is the Wiener gain factor corresponding to the first channel frequency domain signal, $W_{x2}(k)$ is the Wiener gain factor corresponding to the second channel frequency domain signal; $X_1(k)$ is the first channel frequency domain signal, $X_2(k)$ is the second channel frequency domain signal, $X_2^*(k)$ is a conjugate function of $X_2(k)$, $\Gamma^2(k)$ is a squared coherence value of a $k^{th}$ frequency bin of the current frame, $$\Gamma^2(k) = \frac{|X_1(k)X_2^*(k)|^2}{|X_1(k)|^2|X_2(k)|^2},$$

k is a frequency bin index value, k=0, 1, . . . , $N_{DFT}-1$, and $N_{DFT}$ is a total quantity of frequency bins of the current frame after time-frequency transform.

In some possible implementations, the Wiener gain factor corresponding to the first channel frequency domain signal is a first initial Wiener gain factor of the first channel frequency domain signal, and the Wiener gain factor corresponding to the second channel frequency domain signal is a second initial Wiener gain factor of the second channel frequency domain signal. The second inter-channel time difference estimation module is specifically configured to: obtain an estimated value of a first channel noise power spectrum based on the first channel frequency domain signal after the second obtaining module obtains the current frame; determine the first initial Wiener gain factor based on the estimated value of the first channel noise power spectrum; obtain an estimated value of a second channel noise power spectrum based on the second channel frequency domain signal; and determine the second initial Wiener gain factor based on the estimated value of the second channel noise power spectrum.

In some possible implementations, the first initial Wiener gain factor $W_{x1}^A(k)$ satisfies the following formula:

$$W_{x1}^A(k) = \frac{|X_1(k)|^2 - |\hat{N}_1(k)|^2}{|X_1(k)|^2}.$$

The second initial Wiener gain factor $W_{x2}^A(k)$ satisfies the following formula:

$$W_{x2}^A(k) = \frac{|X_2(k)|^2 - |\hat{N}_2(k)|^2}{|X_2(k)|^2}.$$

$|\hat{N}_1(k)|^2$ is the estimated value of the first channel noise power spectrum, $|\hat{N}_2(k)|^2$ is the estimated value of the second channel noise power spectrum, $X_1(k)$ is the first channel frequency domain signal, $X_2(k)$ is the second channel frequency domain signal, k is the frequency bin index value, k=0, 1, . . . , $N_{DFT}-1$, and $N_{DFT}$ is a total quantity of frequency bins of the current frame after time-frequency transform.

In some possible implementations, the Wiener gain factor corresponding to the first channel frequency domain signal is a first improved Wiener gain factor of the first channel frequency domain signal, and the Wiener gain factor corresponding to the second channel frequency domain signal is a second improved Wiener gain factor of the second channel frequency domain signal. The second inter-channel time difference estimation module is further configured to: obtain the first initial Wiener gain factor and the second initial Wiener gain factor after the second obtaining module obtains the current frame; construct a binary masking function for the first initial Wiener gain factor, to obtain the first improved Wiener gain factor; and construct a binary masking function for the second initial Wiener gain factor, to obtain the second improved Wiener gain factor.

In some possible implementations, the first improved Wiener gain factor $W_{x1}^B(k)$ satisfies the following formula:

$$W_{x1}^B(k) = \begin{cases} 1 & \text{if } W_{x1}^A(k) \geq \mu_0 \\ 0 & \text{if } W_{x2}^A(k) < \mu_0 \end{cases}.$$

The second improved Wiener gain factor $W_{x2}^B(k)$ satisfies the following formula:

$$W_{x2}^B(k) = \begin{cases} 1 & \text{if } W_{x2}^A(k) \geq \mu_0 \\ 0 & \text{if } W_{x2}^A(k) < \mu_0 \end{cases}.$$

$\mu_0$ is a binary masking threshold of the Wiener gain factor, $W_{x1}^A$ is the first initial Wiener gain factor, and $W_{x2}^A(k)$ is the second initial Wiener gain factor.

In some possible implementations, the second weighting function $\Phi_{new\_2}(k)$ satisfies the following formula:

$$\Phi_{new\_2}(k) = \frac{1}{|X_1(k)X_2^*(k)|^{\beta}}\Gamma^2(k);$$

$\beta \in [0,1]$, $X_1(k)$ is the first channel frequency domain signal, $X_2(k)$ is the second channel frequency domain signal, $X_2{}^*(k)$ is a conjugate function of $X_2(k)$, $\Gamma^2(k)$ is a squared coherence value of a $k^{th}$ frequency bin of the current frame, $$\Gamma^2(k) = \frac{|X_1(k)X_2^*(k)|^2}{|X_1(k)|^2|X_2(k)|^2},$$

k is a frequency bin index value, k=0, 1, . . . , $N_{DFT}-1$, and $N_{DFT}$ is a total quantity of frequency bins of the current frame after time-frequency transform.

According to a fifth aspect, this application provides an audio coding apparatus, including a non-volatile memory and a processor that are coupled to each other. The processor invokes program code stored in the memory, to perform the stereo audio signal delay estimation method according to any one of the first aspect, the second aspect, and the possible implementations of the first aspect and the second aspect.

According to a sixth aspect, this application provides a computer-readable storage medium. The computer-readable storage medium stores instructions, and when the instructions run on a computer, the stereo audio signal delay estimation method according to any one of the first aspect, the second aspect, and the possible implementations of the first aspect and the second aspect is performed.

According to a seventh aspect, this application provides a computer-readable storage medium, including an encoded bitstream. The encoded bitstream includes an inter-channel time difference of a stereo audio signal obtained according to the stereo audio signal delay estimation method in any one of the first aspect, the second aspect, and the possible implementations of the first aspect and the second aspect.

According to an eighth aspect, this application provides a computer program or a computer program product. When the computer program or the computer program product is executed on a computer, the computer is enabled to implement the stereo audio signal delay estimation method according to any one of the first aspect, the second aspect, and the possible implementations of the first aspect and the second aspect.

It should be understood that, technical solutions in the fourth aspect to the tenth aspect of this application are consistent with technical solutions in the first aspect to the second aspect of this application. Beneficial effects achieved by these aspects and corresponding feasible implementations are similar. Details are not described again.

BRIEF DESCRIPTION OF DRAWINGS

The following describes the accompanying drawings needed for describing the embodiments or the background of this application.

DESCRIPTION OF EMBODIMENTS

Figure 1:
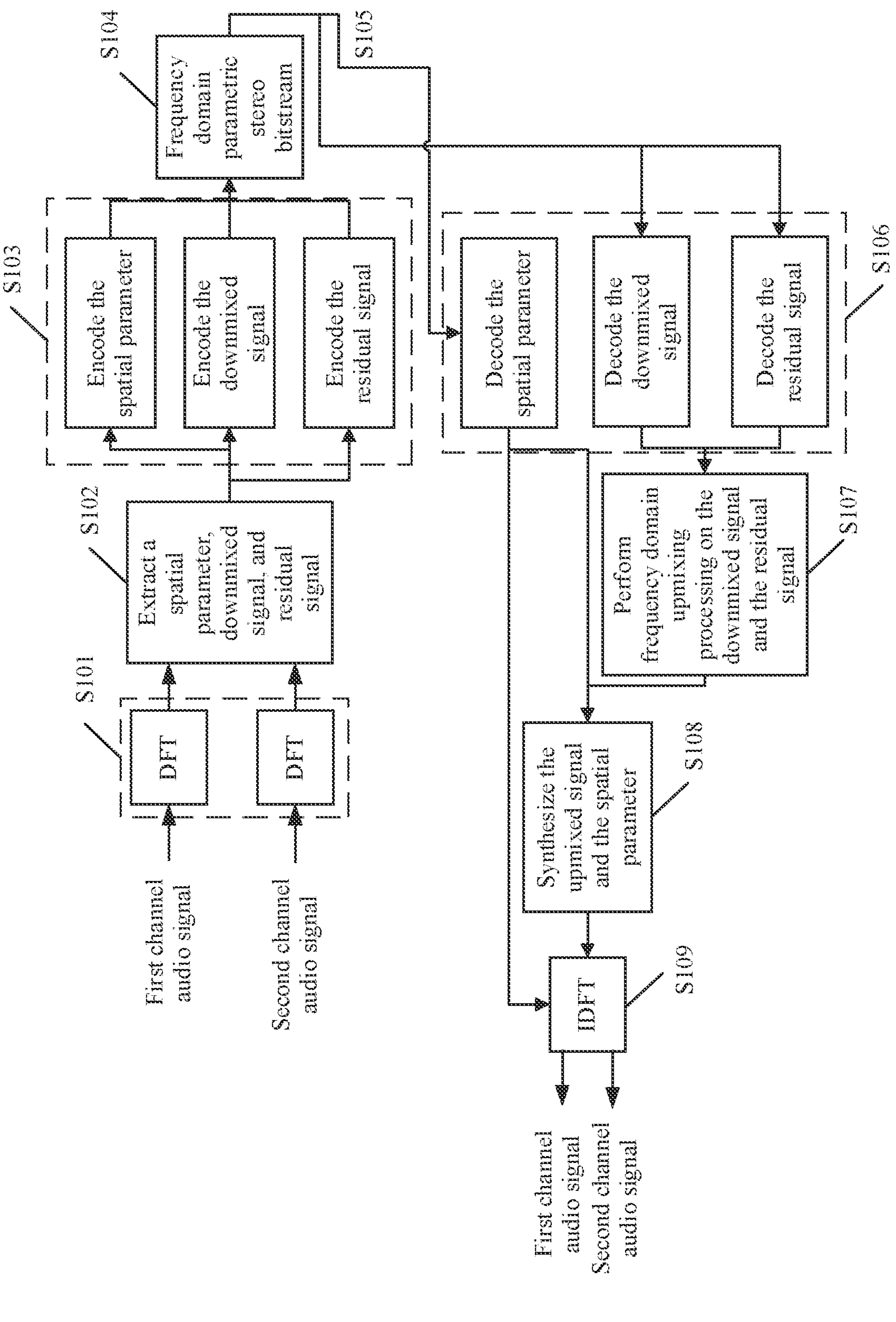
FIG. 1 is a schematic flowchart of a parametric stereo encoding and decoding method in frequency domain according to an embodiment of this application.

The following describes embodiments of this application with reference to the accompanying drawings in embodiments of this application. In the following descriptions, reference is made to the accompanying drawings that form a part of this application and show specific aspects of embodiments of this application in an illustrative manner or in which specific aspects of embodiments of this application may be used. It should be understood that embodiments of this application may be used in other aspects, and may include structural or logical changes not depicted in the accompanying drawings. For example, it should be understood that the disclosure with reference to the described method may also be applied to a corresponding device or system for performing the method, and vice versa. For example, if one or more specific method steps are described, a corresponding device may include one or more units such as functional units for performing the described one or more method steps (for example, one unit performs the one or more steps; or a plurality of units, each of which performs one or more of the plurality of steps), even if such one or more units are not explicitly described or illustrated in the accompanying drawings. In addition, for example, if a specific apparatus is described based on one or more units such as a functional unit, a corresponding method may include one step for implementing functionality of one or more units (for example, one step for implementing functionality of one or more units; or a plurality of steps, each of which is for implementing functionality of one or more units in a plurality of units), even if such one or more of steps are not explicitly described or illustrated in the accompanying drawings. Further, it should be understood that features of various example embodiments and/or aspects described in this specification may be combined with each other, unless otherwise specified.

In a voice and audio communication system, single-channel audio is increasingly unable to meet people's demands. Meanwhile, stereo audio carries location information of each sound source. This improves definition and intelligibility of the audio, and improves sense of reality of the audio. Therefore, stereo audio is increasingly popular among people.

In the voice and audio communication system, an audio encoding and decoding technology is a very important technology. The technology is based on an auditory model, uses minimum energy to sense distortion, and expresses an audio signal at a lowest coding rate as possible, to facilitate audio signal transmission and storage. To meet demands for high-quality audio, a series of stereo encoding and decoding technologies are developed.

A most commonly used stereo encoding and decoding technology is a parametric stereo encoding and decoding technology. The theoretical basis of this technology is the spatial hearing principle. Specifically, in an audio encoding process, a raw stereo audio signal is converted into a single-channel signal and some spatial parameters for representation, or a raw stereo audio signal is converted into a single-channel signal, a residual signal, and some spatial parameters for representation. In an audio decoding process, the stereo audio signal is reconstructed by using the decoded single-channel signal and spatial parameters, or the stereo audio signal is reconstructed by using the decoded single-channel signal, residual signal, and spatial parameters.

FIG. 1 is a schematic flowchart of a parametric stereo encoding and decoding method in frequency domain according to an embodiment of this application. As shown in FIG. 1, the process may include the following steps.

S101: An encoder side performs time-frequency transform (for example, discrete Fourier transform (DFT)) on a first channel audio signal and a second channel audio signal of a current frame of a stereo audio signal, to obtain a first channel frequency domain signal and a second channel frequency domain signal.

First, it should be noted that the stereo audio signal input to the encoder side may include two audio signals, that is, the first channel audio signal and the second channel audio signal (for example, a left channel audio signal and a right channel audio signal). The two audio signals included in the stereo audio signal may also be two audio signals in a multi-channel audio signal or two audio signals generated by combining a plurality of audio signals in a multi-channel audio signal. This is not specifically limited herein.

Herein, when encoding the stereo audio signal, the encoder side performs framing processing to obtain a plurality of audio frames, and processes the audio frames frame by frame.

S102: The encoder side extracts a spatial parameter, a downmixed signal, and a residual signal for the first channel frequency domain signal and the second channel frequency domain signal.

The spatial parameter may include: ICC, ILD, ITD, IPD, and the like.

S103: The encoder side separately encodes the spatial parameter, the downmixed signal, and the residual signal.

S104: The encoder side generates a frequency domain parametric stereo bitstream based on the encoded spatial parameter, downmixed signal, and residual signal.

S105: The encoder side sends the frequency domain parametric stereo bitstream to a decoder side.

S106: The decoder side decodes the received frequency domain parametric stereo bitstream to obtain a corresponding spatial parameter, downmixed signal, and residual signal.

S107: The decoder side performs frequency domain upmixing processing on the downmixed signal and the residual signal to obtain an upmixed signal.

S108: The decoder side synthesizes the upmixed signal and the spatial parameter to obtain a frequency domain audio signal.

S109: The decoder side performs inverse time-frequency transform (for example, inverse discrete Fourier transform (IDFT)) on the frequency domain audio signal based on the spatial parameter, to obtain the first channel audio signal and the second channel audio signal of the current frame.

Further, the encoder side performs the first to fifth steps for each audio frame in the stereo audio signal, and the decoder side performs the sixth to ninth steps for each frame. In this way, the decoder side may obtain the first channel audio signal and the second channel audio signal of the plurality of audio frames, and further obtain the first channel audio signal and the second channel audio signal of the stereo audio signal.

In the foregoing parametric stereo encoding and decoding process, the ILD and the ITD in the spatial parameter contain location information of a sound source. Therefore, accurate estimation of the ILD and the ITD is crucial to reconstruction of a stereo sound image and sound field.

Figure 2:
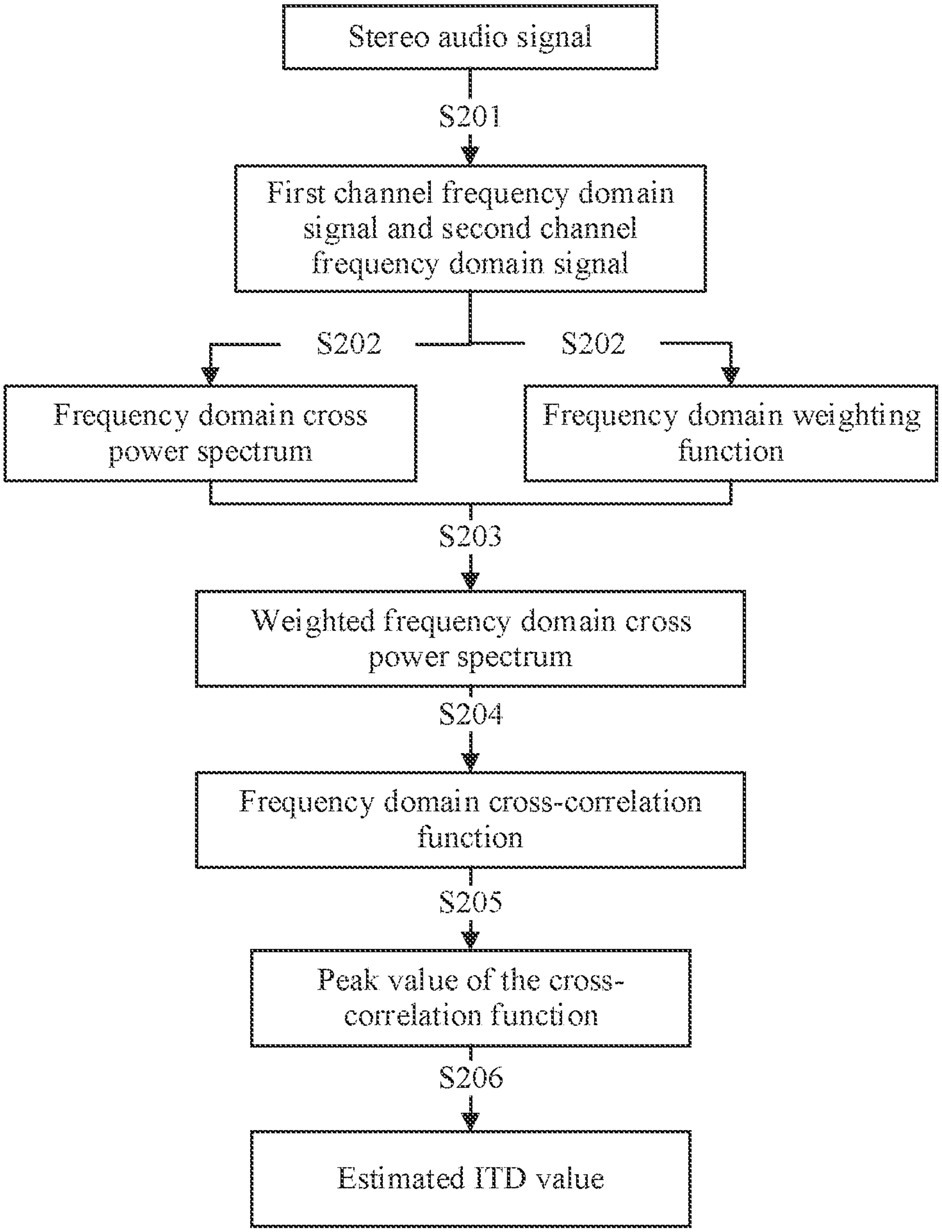
FIG. 2 is a schematic flowchart of a generalized cross-correlation algorithm according to an embodiment of this application.

In the parametric stereo encoding technology, the most commonly used ITD estimation method may be a generalized cross-correlation method, which has advantages such as low complexity, good real-time performance, easy implementation, and are not dependent on other prior information of the stereo audio signal. FIG. 2 is a schematic flowchart of a generalized cross-correlation algorithm according to an embodiment of this application. As shown in FIG. 2, the method may include the following steps.

S201: An encoder side performs DFT on a stereo audio signal, to obtain a first channel frequency domain signal and a second channel frequency domain signal.

S202: The encoder side calculates a frequency domain cross power spectrum and a frequency domain weighting function of the first channel frequency domain signal and the second channel frequency domain signal based on the first channel frequency domain signal and the second channel frequency domain signal.

S203: The encoder side performs weighting on the frequency domain cross power spectrum based on the frequency domain weighting function.

S204: The encoder side performs IDFT on the weighted frequency domain cross power spectrum, to obtain a frequency domain cross-correlation function.

S205: The encoder side performs peak detection on the frequency domain cross-correlation function.

S206: The encoder side determines an estimated ITD value based on a peak value of the cross-correlation function.

In the generalized cross-correlation algorithm, the frequency domain weighting function in the second step may use the following functions.

Type 1: The frequency domain weighting function in the foregoing second step may be shown in a formula (1):

$$\Phi_{PHAT}(k) = \frac{1}{|X_1(k)X_2^*(k)|} \tag{1}$$

$\Phi_{PHAT}(k)$ is a PHAT weighting function, $X_1(k)$ is a frequency domain audio signal of a first channel audio signal $x_1(n)$, that is, the first channel frequency domain signal, $X_2(k)$ is a frequency domain audio signal of a second channel audio signal $x_2(n)$, that is, the second channel frequency domain signal, $X_1(k)X_2^*(k)$ is a cross power spectrum of the first channel and the second channel, k is a frequency bin index value, k=0, 1, . . . , $N_{DFT}-1$, and $N_{DFT}$ is a total quantity of frequency bins of the current frame after time-frequency transform.

Correspondingly, the weighted generalized cross-correlation function may be shown in a formula (2):

$$G_{x1x2}(n) = \frac{1}{N_{DFT}} \sum_{k=0}^{N_{DFT}-1} \frac{X_1(k)X_2^*(k)}{|X_1(k)X_2^*(k)|} e^{i2\pi\frac{kn}{N_{DFT}}} \tag{2}$$

In actual application, performing ITD estimation based on the frequency domain weighting function shown in the formula (1) and the weighted generalized cross-correlation function shown in the formula (2) may be referred to as a generalized cross-correlation phase transform (GCC-PHAT) algorithm. Energy of the stereo audio signal greatly varies between different frequency bins, a frequency bin with low energy is greatly affected by noise, and a frequency bin with high energy is slightly affected by noise. In the GCC-PHAT algorithm, after the cross power spectrum is weighted based on the PHAT weighting function, weights of weighted values of frequency bins in the generalized cross-correlation function are the same. As a result, the GCC-PHAT algorithm is very sensitive to a noise signal, even in the case of medium and high signal-to-noise ratio, performance of the GCC-PHAT algorithm also deteriorates greatly. In addition, when there are one or more noise sources in space, that is, when there is a competing sound source, a coherent noise signal exists in the stereo audio signal, and a peak value corresponding to a target signal (for example, a speech signal) in the current frame is weakened. Therefore, in some cases, for example, energy of the coherent noise signal is greater than energy of the target signal or the noise source is closer to a microphone, the peak value of the coherent noise signal is greater than the peak value corresponding to the target signal. In this case, the estimated ITD value of the stereo audio signal is the estimated ITD value of the noise signal. That is, if there is coherent noise, ITD estimation precision of the stereo audio signal is severely reduced, and the estimated ITD value of the stereo audio signal is continuously switched between the ITD value of the target signal and the ITD value of the noise signal, affecting sound image stability of the encoded stereo audio signal.

Type 2: The frequency domain weighting function in the foregoing second step may be shown in a formula (3):

$$\Phi_{PHAT-\beta}(k) = \frac{1}{|X_1(k)X_2^*(k)|^{\beta}} \tag{3}$$

β is an amplitude weighting parameter, and βΣ[0, 1].

Correspondingly, the weighted generalized cross-correlation function may further be shown in a formula (4):

$$G_{x1x2}(n) = \frac{1}{N_{DFT}}\sum_{k=0}^{N_{DFT}-1}\frac{X_1(k)X_2^*(k)}{|X_1(k)X_2^*(k)|^{\beta}}e^{i2\pi\frac{kn}{N_{DFT}}} \tag{4}$$

In actual application, performing ITD estimation based on the frequency domain weighting function shown in the formula (3) and the weighted generalized cross-correlation function shown in the formula (4) may be referred to as a GCC-PHAT-β algorithm. Because optimal values of β are different for different noise signal types, and the optimal values differ greatly. Therefore, performance of the GCC-PHAT-β algorithm for different noise signal types is different. In addition, in the case of medium and high signal-to-noise ratio, although the performance of the GCC-PHAT-β algorithm is improved to some extent, ITD estimation precision required by the parametric stereo encoding and decoding technology cannot be met. Further, if there is coherent noise, the performance of the GCC-PHAT-β algorithm also severely deteriorates.

Type 3: The frequency domain weighting function in the foregoing second step may be shown in a formula (5):

$$\Phi_{PHAT-Coh}(k) = \frac{1}{|X_1(k)X_2^*(k)|}\frac{|X_1(k)X_2^*(k)|^2}{|X_1(k)|^2|X_2(k)|^2} \tag{5}$$

$\Gamma^2$ (k) is a squared coherence value of a $k^{th}$ frequency bin of the current frame, and $$\Gamma^2(k) = \frac{|X_1(k)X_2^*(k)|^2}{|X_1(k)|^2|X_2(k)|^2}.$$

Correspondingly, the weighted generalized cross-correlation function may further be shown in a formula (6):

$$G_{x1x2}(n) = \frac{1}{N_{DFT}}\sum_{k=0}^{N_{DFT}-1}\frac{X_1(k)X_2^*(k)}{|X_1(k)X_2^*(k)|}\frac{|X_1(k)X_2^*(k)|^2}{|X_1(k)|^2|X_2(k)|^2}e^{i2\pi\frac{kn}{N_{DFT}}} \tag{6}$$

In actual application, performing ITD estimation based on the frequency domain weighting function shown in the formula (5) and the weighted generalized cross-correlation function shown in the formula (6) may be referred to as a GCC-PHAT-Coh algorithm. Under some conditions, squared coherence values of most frequency bins in the coherent noise in the stereo audio signal are greater than a squared coherence value of the target signal in the current frame. As a result, performance of the GCC-PHAT-Coh algorithm severely deteriorates. In addition, energy of the stereo audio signal greatly varies between different frequency bins, and the GCC-PHAT-Coh algorithm does not consider impact of the energy difference between different frequency bins on algorithm performance. As a result, ITD estimation performance is poor in some conditions.

It can be learned from the foregoing that noise has a serious impact on the performance of the generalized cross-correlation algorithm. Consequently, ITD estimation precision severely deteriorates, and problems such as sound image inaccuracy, instability, poor sense of space, and obvious in-head effect occur in a decoded stereo audio signal in the parametric encoding and decoding technology, severely affecting sound quality of an encoded stereo audio signal.

To solve the foregoing problem, an embodiment of this application provides a stereo audio signal delay estimation method. The method may be applied to an audio coding apparatus. The audio coding apparatus may be applied to an audio coding part in a stereo and multi-channel audio and video communication system, or may be applied to an audio coding part in a VR application program.

In actual application, the audio coding apparatus may be disposed in a terminal in an audio and video communication system. For example, the terminal may be a device that provides voice or data connectivity for a user. For example, the terminal may alternatively be referred to as user equipment (UE), a mobile station, a subscriber unit, a station, or terminal equipment (TE). The terminal device may be a cellular phone, a personal digital assistant (PDA), a wireless modem, a handheld device, a laptop computer, a cordless phone, a wireless local loop (WLL) station, a pad, and the like. With development of wireless communication technologies, any device that can access a wireless communication system, communicate with a network side of a wireless communication system, or communicate with another device by using a wireless communication system may be the terminal device in embodiments of this application, such as a terminal and a vehicle in intelligent transportation, a household device in a smart household, an electricity meter reading instrument in a smart grid, a voltage monitoring instrument, an environment monitoring instrument, a video surveillance instrument in an intelligent security network, or a cash register. The terminal device may be stationary and fixed or mobile.

Alternatively, the audio encoder may be further disposed on a device having a VR function. For example, the device may be a smartphone, a tablet computer, a smart television, a notebook computer, a personal computer, a wearable device (such as VR glasses, a VR helmet, or a VR hat), or the like that supports a VR application, or may be disposed on a cloud server that communicates with the device having the VR function. Certainly, the audio coding apparatus may also be disposed on another device having a function of stereo audio signal storage and/or transmission. This is not specifically limited in this embodiment of this application.

In this embodiment of this application, the stereo audio signal may be a raw stereo audio signal (including a left channel audio signal and a right channel audio signal), or may be a stereo audio signal formed by two audio signals in a multi-channel audio signal, or may be a stereo signal formed by two audio signals generated by combining a plurality of audio signals in a multi-channel audio signal. Certainly, the stereo audio signal may alternatively be in another form. This is not specifically limited in this embodiment of this application. In the following embodiment, an example in which the stereo audio signal is a raw stereo audio signal is used for description. The stereo audio signal may include a left channel time domain signal and a right channel time domain signal in time domain, and the stereo audio signal may include a left channel frequency domain signal and a right channel frequency domain signal in frequency domain. In the following embodiments, a first channel audio signal may be a left channel audio signal (in time domain or frequency domain), a first channel time domain signal may be a left channel time domain signal, and a first channel frequency domain signal may be a left channel frequency domain signal. Similarly, a second channel audio signal may be a right channel audio signal (in time domain or frequency domain), a second channel time domain signal may be a right channel time domain signal, and a second channel frequency domain signal may be a right channel frequency domain signal.

Optionally, the audio coding apparatus may specifically be a stereo coding apparatus. The apparatus may constitute an independent stereo coder; or may be a core coding part of a multi-channel coder, to encode a stereo audio signal formed by two audio signals generated by combining a plurality of signals in a multi-channel audio signal.

The following describes a stereo audio signal delay estimation method provided in an embodiment of this application.

First, a frequency domain weighting function provided in this embodiment of this application is described.

In this embodiment of this application, to improve performance of the generalized cross-correlation algorithm, the frequency domain weighting functions (for example, as shown in the foregoing formulas (1), (3), and (5)) in the foregoing several algorithms may be improved, and the improved frequency domain weighting functions may be but are not limited to the following several functions.

A construction factor of a first improved frequency domain weighting function (that is, a first weighting function) may include: a left channel Wiener gain factor (that is, a Wiener gain factor corresponding to a first channel frequency domain signal), a right channel Wiener gain factor (that is, a Wiener gain factor corresponding to a second channel frequency domain signal), and a squared coherence value of a current frame.

Herein, the construction factor refers to a factor or factors used to construct a target function. When the target function is an improved frequency domain weighting function, the construction factor may be one or more functions used to construct the improved frequency domain weighting function.

In actual application, the first improved frequency domain weighting function may be shown in a formula (7):

$$\Phi_{new\_1}(k) = \frac{W_{x1}(k)W_{x2}(k)}{|X_1(k)X_2(k)|^\beta} \times \frac{\Gamma^2(k)}{(1-\Gamma^2(k))} \tag{7}$$

$\Phi_{new\_1}(k)$ is the first improved frequency domain weighting function, β is an amplitude weighting parameter, β∈[0, 1], for example, β=0.6, 0.7, or 0.8, $W_{x1}(k)$ is the left channel Wiener gain factor, $W_{x2}(k)$ is the right channel Wiener gain factor, $\Gamma^2$ (k) is a squared coherence value of a $k^{th}$ frequency bin of the current frame, and $$\Gamma^2(k) = \frac{|X_1(k)X_2^*(k)|^2}{|X_1(k)|^2|X_2(k)|^2}.$$

In some possible embodiments, the first improved frequency domain weighting function may be further shown in a formula (8):

$$\Phi_{new\_1}(k) = \frac{W_{x1}(k)W_{x2}(k)}{|X_1(k)X_2^*(k)|^\beta} \times \Gamma^2(k) \tag{8}$$

Correspondingly, a generalized cross-correlation function weighted based on using the first improved frequency domain weighting function may also be shown in a formula (9):

$$G_{x1x2}(n) = \frac{1}{N_{DFT}} \sum_{k=0}^{N_{DFT}-1} \Phi_{new\_1}(k)X_1(k)X_2^*(k)e^{i2\pi\frac{kn}{N_{DFT}}} \tag{9}$$

In some possible implementations, the left channel Wiener gain factor may include a first initial Wiener gain factor and/or a first improved Wiener gain factor, and the right channel Wiener gain factor may include a second initial Wiener gain factor and/or a second improved Wiener gain factor.

In actual application, the first initial Wiener gain factor may be determined by performing noise power spectrum estimation on $X_1(k)$. Specifically, when the left channel Wiener gain factor includes the first initial Wiener gain factor, the method may further include: the audio coding apparatus may first obtain an estimated value of a left channel noise power spectrum of the current frame based on the left channel frequency domain signal $X_1$ (k) of the current frame, and then determine the first initial Wiener gain factor based on the estimated value of the left channel noise power spectrum. Similarly, the second initial Wiener gain factor may also be determined by performing noise power spectrum estimation on $X_2(k)$. Specifically, when the right channel Wiener gain factor includes the second initial Wiener gain factor, the audio coding apparatus may first obtain an estimated value of a right channel noise power spectrum of the current frame based on the right channel frequency domain signal $X_2(k)$ of the current frame, and determine the second initial Wiener gain factor based on the estimated value of the right channel noise power spectrum.

In the foregoing process of performing noise power spectrum estimation on $X_1(k)$ and $X_2(k)$ of the current frame, an algorithm such as a minimum statistics algorithm or a minimum tracking algorithm may be used for calculation. Certainly, another algorithm may be used to calculate the estimated value of the noise power spectrum of $X_1(k)$ and $X_2(k)$. This is not specifically limited in this embodiment of this application.

For example, the first initial Wiener gain factor $W_{x1}^{A}(k)$ may be shown in a formula (10):

$$W_{x1}^{A}(k)=\frac{|X_1(k)|^2-|\hat{N}_1(k)|^2}{|X_1(k)|^2} \tag{10}$$

The second initial Wiener gain factor $W_{x2}^{A}(k)$ may be shown in a formula (11):

$$W_{x2}^{A}(k)=\frac{|X_2(k)|^2-|\hat{N}_2(k)|^2}{|X_2(k)|^2} \tag{11}$$

$|\hat{N}_1(k)|^2$ is the estimated value of the left channel noise power spectrum, and $|\hat{N}_2(k)|^2$ is the estimated value of the right channel noise power spectrum.

In some possible implementations, in addition to directly using the first initial Wiener gain factor and the second initial Wiener gain factor as the left channel Wiener gain factor and the right channel Wiener gain factor to construct the first improved frequency domain weighting function, a corresponding binary masking function may alternatively be constructed based on the first initial Wiener gain factor and the second initial Wiener gain factor, to obtain the first improved Wiener gain factor and the second improved Wiener gain factor. A frequency bin slightly affected by noise can be screened out by using the first improved frequency domain weighting function constructed by using the first improved Wiener gain factor and the second improved Wiener gain factor, improving ITD estimation precision of the stereo audio signal.

In this case, when the left channel Wiener gain factor includes the first improved Wiener gain factor, the method may further include: after obtaining the first initial Wiener gain factor, the audio coding apparatus constructs a binary masking function for the first initial Wiener gain factor to obtain the first improved Wiener gain factor. Similarly, after obtaining the second initial Wiener gain factor, the audio coding apparatus constructs a binary masking function for the second initial Wiener gain factor to obtain the second improved Wiener gain factor.

For example, the first improved Wiener gain factor n (k) may be shown in a formula (12):

$$W_{x1}^{B}(k)=\begin{cases}1 & \text{if } W_{x1}^{A}(k)\geq\mu_0\\ 0 & \text{if } W_{x1}^{A}(k)<\mu_0\end{cases} \tag{12}$$

The second improved Wiener gain factor $W_{x2}^{B}(k)$ may be shown in a formula (13):

$$W_{x2}^{B}(k)=\begin{cases}1 & \text{if } W_{x2}^{A}(k)\geq\mu_0\\ 0 & \text{if } W_{x2}^{A}(k)<\mu_0\end{cases} \tag{13}$$

$\mu_0$ is a binary masking threshold of the Wiener gain factor, and $\mu_0\in[0.5, 0.8]$, for example, $\mu_0=0.5$, 0.66, 0.75, or 0.8.

Therefore, it can be learned from the foregoing that, the left channel Wiener gain factor $W_{x1}(k)$ may include $W_{x1}^{A}(k)$ and $W_{x1}^{B}(k)$, and the right channel Wiener gain factor $W_{x2}(k)$ may include $W_{x2}^{A}(k)$ and $W_{x2}^{B}(k)$. In this case, in a process of constructing the first improved frequency domain weighting function such as the formula (7) or (8), $W_{x1}^{A}(k)$ and $W_{x2}^{A}(k)$ may be substituted into the formula (7) or (8), or $W_{x1}^{B}(k)$ and $W_{x2}^{B}(k)$ may be substituted into the formula (7) or (8).

For example, the first improved frequency domain weighting function obtained after $W_{x1}^{A}(k)$ and $W_{x2}^{A}(k)$ are substituted into the formula (7) may be shown in a formula (14):

$$\Phi_{new\_1}(k)=\frac{W_{x1}^{A}(k)W_{x2}^{A}(k)}{|X_1(k)X_2^{*}(k)|^{\beta}}\frac{\Gamma^2(k)}{(1-\Gamma^2(k))} \tag{14}$$

The first improved frequency domain weighting function obtained after $W_{x1}^{B}(k)$ and $W_{x2}^{B}(k)$ are substituted into the formula (7) may be shown in a formula (15):

$$\Phi_{new\_1}(k)=\frac{W_{x1}^{B}(k)W_{x2}^{B}(k)}{|X_1(k)X_2^{*}(k)|^{\beta}}\frac{\Gamma^2(k)}{(1-\Gamma^2(k))} \tag{15}$$

In this embodiment of this application, if the first improved frequency domain weighting function is used to weight the frequency domain cross power spectrum of the current frame, after the Wiener gain factor weighting, a weight of a coherent noise component in the frequency domain cross power spectrum of the stereo audio signal is greatly reduced, and correlation of residual noise components is also greatly reduced. In most cases, a squared coherence value of the residual noise is much smaller than the squared coherence value of the target signal in the stereo audio signal. In this way, a cross-correlation peak value corresponding to the target signal is more prominent, and ITD estimation precision and stability of the stereo audio signal will be greatly improved.

A construction factor of a second improved frequency domain weighting function (that is, a second weighting function) may include: an amplitude weighting parameter $\beta$ and a squared coherence value of the current frame.

In actual application, the second improved frequency domain weighting function may be shown in a formula (16):

$$\Phi_{new\_2}(k)=\frac{1}{|X_1(k)X_2^{*}(k)|^{\beta}}\Gamma^2(k) \tag{16}$$

$\Phi_{new\_2}$ is the second improved frequency domain weighting function, and $\beta\in[0,1]$, for example, $\beta=0.6$, 0.7, or 0.8.

Correspondingly, a generalized cross-correlation function weighted based on using the second improved frequency domain weighting function may also be shown in a formula (17):

$$G_{x1x2}(n) = \frac{1}{N_{DFT}} \sum_{k=0}^{N_{DFT}-1} \Phi_{new\_2}(k) X_1(k) X_2^*(k) e^{i2\pi\frac{kn}{N_{DFT}}} \quad (17)$$

In this embodiment of this application, weighting the frequency domain cross power spectrum of the current frame by using the second improved frequency domain weighting function can ensure that a frequency bin with high energy and a frequency bin with high correlation have a large weight, and a frequency bin with low energy or a frequency bin with low correlation has a small weight, improving ITD estimation precision of the stereo audio signal.

Next, a stereo audio signal delay estimation method provided in an embodiment of this application is described. According to the method, an ITD value of a current frame is estimated based on the foregoing improved frequency domain weighting function.

Figure 3:
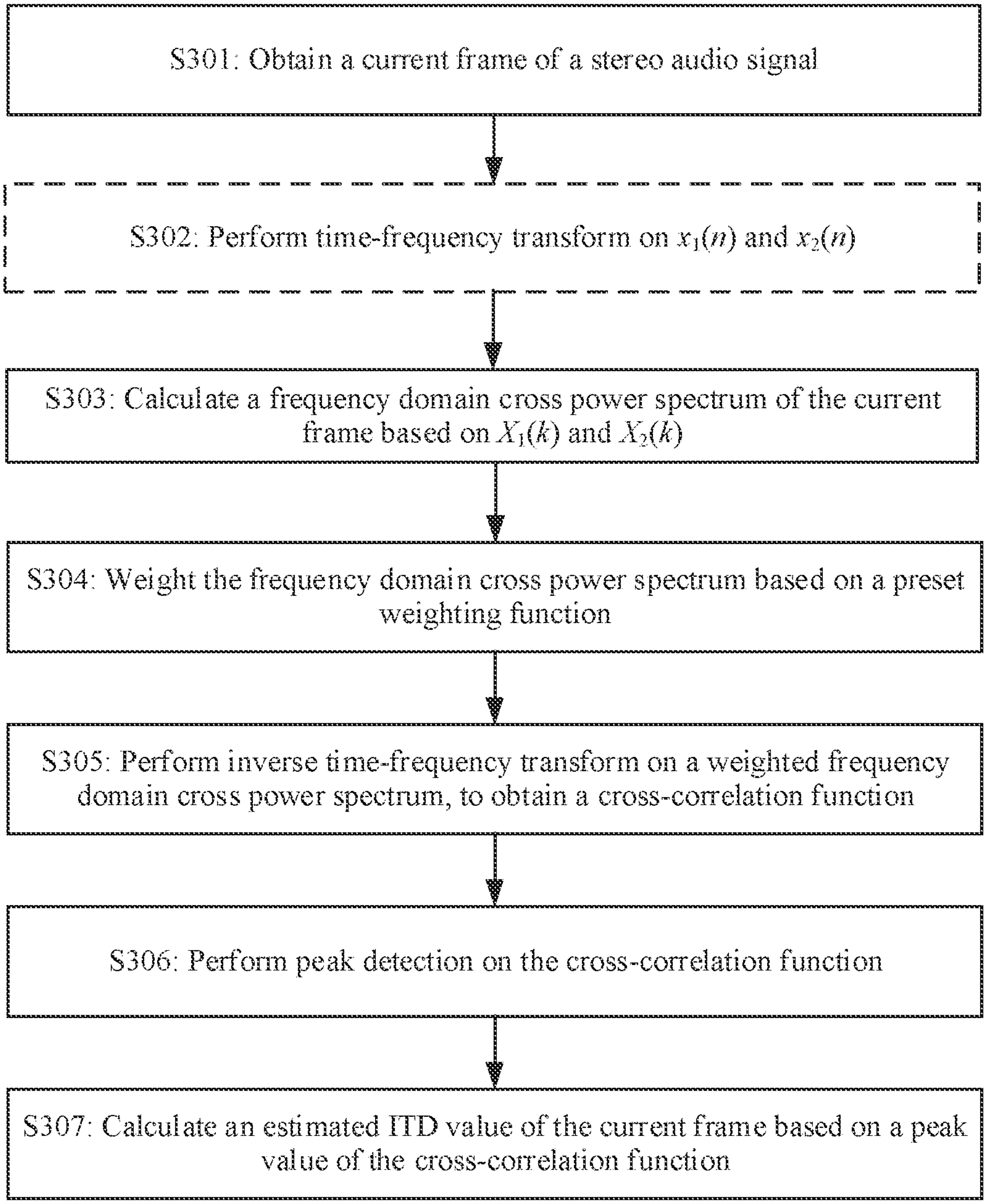
FIG. 3 is a schematic flowchart 1 of a stereo audio signal delay estimation method according to an embodiment of this application.

FIG. 3 is a schematic flowchart 1 of a stereo audio signal delay estimation method according to an embodiment of this application. Refer to solid lines in FIG. 3. The method may include the following steps.

S301: Obtain a current frame of a stereo audio signal.

The current frame includes a left channel audio signal and a right channel audio signal.

An audio coding apparatus obtains an input stereo audio signal. The stereo audio signal may include two audio signals, and the two audio signals may be time domain audio signals or frequency domain audio signals.

In one case, the two audio signals in the stereo audio signal are time domain audio signals, that is, a left channel time domain signal and a right channel time domain signal (that is, a first channel time domain signal and a second channel time domain signal). In this case, the stereo audio signal may be input by using a sound sensor such as a microphone or a receiver. Refer to dashed lines in FIG. 3. After S301, the method may further include: S302: Perform time-frequency transform on the left channel time domain signal and the right channel time domain signal. Herein, the audio coding apparatus performs framing processing on the time domain audio signal through S301 to obtain a current frame in time domain. In this case, the current frame may include the left channel time domain signal and the right channel time domain signal. Then the audio coding apparatus performs time-frequency transform on the current frame in time domain to obtain a current frame in frequency domain. In this case, the current frame may include a left channel frequency domain signal and a right channel frequency domain signal (that is, a first channel frequency domain signal and a second channel frequency domain signal).

In another case, the two audio signals in the stereo audio signal are frequency domain audio signals, that is, a left channel frequency domain signal and a right channel frequency domain signal (that is, a first channel frequency domain signal and a second channel frequency domain signal). In this case, the stereo audio signal is two frequency domain audio signals. Therefore, the audio coding apparatus may directly perform framing processing on the stereo audio signal (namely, the frequency domain audio signal) in frequency domain through S301 to obtain a current frame in frequency domain. The current frame may include the left channel frequency domain signal and the right channel frequency domain signal (namely, the first channel frequency domain signal and the second channel frequency domain signal).

It should be noted that, in description of subsequent embodiments, if the stereo audio signal is a time domain audio signal, the audio coding apparatus may perform time-frequency transform on the stereo audio signal to obtain a corresponding frequency domain audio signal, and then process the stereo audio signal in frequency domain. If the stereo audio signal is a frequency domain audio signal, the audio coding apparatus may directly process the stereo audio signal in frequency domain.

In actual application, the left channel time domain signal in the current frame obtained after framing processing is performed may be denoted as $x_1(n)$, and the right channel time domain signal in the current frame obtained after framing processing is performed may be denoted as $x_2(n)$, where n is a sampling point.

In some possible implementations, after S301, the audio coding apparatus may further preprocess the current frame, for example, perform high-pass filtering processing on $x_1(n)$ and $x_2(n)$ to obtain a preprocessed left channel time domain signal and a preprocessed right channel time domain signal, where the preprocessed left channel time domain signal is denoted as $x_1^{hp}(n)$, and the preprocessed right channel time domain signal is denoted as $x_2^{hp}(n)$. Optionally, the high-pass filtering processing may be an infinite impulse response (IIR) filter with a cut-off frequency of 20 Hz, or may be another type of filter. This is not specifically limited in this embodiment of this application.

Optionally, the audio coding apparatus may further perform time-frequency transform on $x_1(n)$ and $x_2(n)$ to obtain $X_1(k)$ and $X_2(k)$, where the left channel frequency domain signal may be denoted as $X_1(k)$, and the right channel frequency domain signal may be denoted as $X_2(k)$.

Herein, the audio coding apparatus may transform a time domain signal into a frequency domain signal by using a time-frequency transform algorithm such as DFT, fast Fourier transform (FFT), or modified discrete cosine transform (MDCT). Certainly, the audio coding apparatus may further use another time-frequency transform algorithm. This is not specifically limited in this embodiment of this application.

It is assumed that time-frequency transform is performed on the left channel time domain signal and the right channel time domain signal by using DFT. Specifically, the audio coding apparatus may perform DFT on $x_1(n)$ or $x_1^{hp}(n)$ to obtain $X_1(k)$. Similarly, the audio coding apparatus may perform DFT on $x_2(n)$ or $x_2^{hp}(n)$ to obtain $X_2(k)$.

Further, to overcome spectrum aliasing, DFT of two adjacent frames is usually performed in an overlap-add manner, and sometimes zero may be padded to an input signal for DFT.

S303: Calculate a frequency domain cross power spectrum of the current frame based on $X_1(k)$ and $X_2(k)$.

Herein, the frequency domain cross power spectrum of the current frame may be shown in a formula (18):

$$C_{x1x2}(k) = X_1(k) X_2^*(k) \quad (18)$$

$X_2^*(k)$ is a conjugate function of $X_2(k)$.

S304: Weight the frequency domain cross power spectrum based on a preset weighting function.

Herein, the preset weighting function may refer to the foregoing improved frequency domain weighting function, that is, the first improved frequency domain weighting function $\Phi_{new\_1}$ or the second improved frequency domain weighting function $\Phi_{new\_2}$ in the foregoing embodiment.

S304 may be understood as that the audio coding apparatus multiplies the improved weighting function by the frequency domain power spectrum, and then the weighted frequency domain cross power spectrum may be expressed as $\Phi_{new\_1}(k)C_{x1x2}(k)$ or $\Phi_{new\_2}(k)C_{x1x2}(k)$.

In this embodiment of this application, before performing S305, the audio coding apparatus may further calculate the improved frequency domain weighting function (that is, the preset weighting function) by using $X_1(k)$ and $X_2(k)$.

S305: Perform inverse time-frequency transform on the weighted frequency domain cross power spectrum to obtain a cross-correlation function.

The audio coding apparatus may use an inverse time-frequency transform algorithm corresponding to the time-frequency transform algorithm used in S302 to transform the frequency domain cross power spectrum from frequency domain to time domain, to obtain the cross-correlation function.

Herein, the cross-correlation function corresponding to $\Phi_{new\_1}(k)C_{x1x2}(k)$ may be shown in a formula (19):

$$G_{x1x2}(n)=\frac{1}{N_{DFT}}\sum_{k=0}^{N_{DFT}-1}\Phi_{new\_1}(k)C_{x1x2}(k)e^{i2\pi\frac{kn}{N_{DFT}}} \tag{19}$$

Alternatively, the cross-correlation function corresponding to $\Phi_{new\_2}(k)C_{x1x2}(k)$ may be shown in a formula (20):

$$G_{x1x2}(n)=\frac{1}{N_{DFT}}\sum_{k=0}^{N_{DFT}-1}\Phi_{new\_2}(k)C_{x1x2}(k)e^{i2\pi\frac{kn}{N_{DFT}}} \tag{20}$$

S306: Perform peak detection on the cross-correlation function.

After obtaining the cross-correlation function through S306, the audio coding apparatus may determine a maximum value Amax of the ITD (which may also be understood as a time range for ITD estimation) based on a preset sampling rate and a maximum distance between sound sensors (that is, a microphone, a receiver, and the like). For example, Amax is set to a quantity of sampling points corresponding to 5 ms. If the sampling rate of the stereo audio signal is 32 kHz, $\Delta$max=160, that is, a maximum quantity of delay points of the left channel and the right channel is 160 sampling points. Then, the audio coding apparatus searches for a maximum peak value of $G_{x1x2}(n)$ in a range of $n \in [-\Delta\text{max}, \Delta\text{max}]$, and an index value corresponding to the peak is a candidate ITD value of the current frame.

S307: Calculate an estimated ITD value of the current frame based on the peak of the cross-correlation function.

The audio coding apparatus determines the candidate ITD value of the current frame based on the peak value of the cross-correlation function, and then determines the estimated ITD value of the current frame based on side information such as the candidate ITD value of the current frame, an ITD value of the previous frame (that is, historical information), an audio hangover processing parameter, and correlation between a previous frame and a next frame, to remove an abnormal value of delay estimation.

Further, after determining the estimated ITD value through S307, the audio coding apparatus may code and write the estimated ITD value into an encoded bitstream of the stereo audio signal.

In this embodiment of this application, if the first improved frequency domain weighting function is used to weight the frequency domain cross power spectrum of the current frame, after the Wiener gain factor weighting, a weight of a coherent noise component in the frequency domain cross power spectrum of the stereo audio signal is greatly reduced, and correlation of residual noise components is also greatly reduced. In most cases, a squared coherence value of the residual noise is much smaller than the squared coherence value of the target signal in the stereo audio signal. In this way, a cross-correlation peak value corresponding to the target signal is more prominent, and ITD estimation precision and stability of the stereo audio signal will be greatly improved. Weighting the frequency domain cross power spectrum of the current frame by using the second improved frequency domain weighting function can ensure that a frequency bin with high energy and a frequency bin with high correlation have a large weight, and a frequency bin with low energy or a frequency bin with low correlation has a small weight, improving ITD estimation precision of the stereo audio signal.

Further, another stereo audio signal delay estimation method provided in an embodiment of this application is described. Based on the foregoing embodiment, the method uses different algorithms to perform ITD estimation for different types of noise signals in the stereo audio signal.

Figure 4:
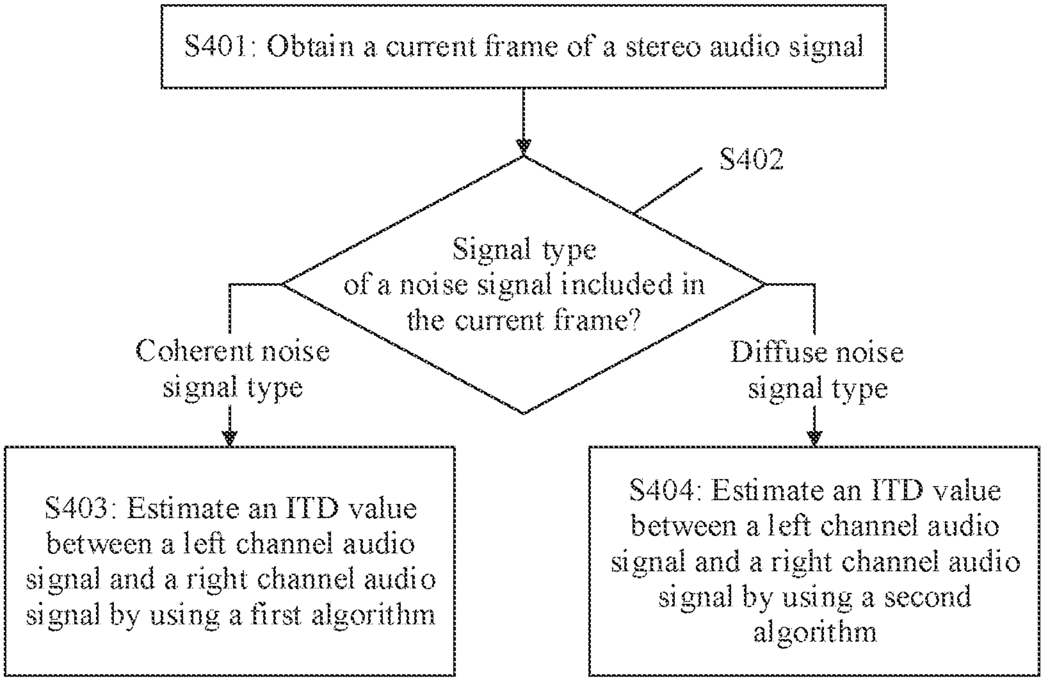
FIG. 4 is a schematic flowchart 2 of a stereo audio signal delay estimation method according to an embodiment of this application.

FIG. 4 is a schematic flowchart 2 of a stereo audio signal delay estimation method according to an embodiment of this application. Refer to FIG. 4. The method may include the following steps.

S401: Obtain a current frame of a stereo audio signal.

Herein, for an implementation process of S401, refer to the description of S301. This is not specifically limited herein.

S402: Determine a signal type of a noise signal included in the current frame. If the signal type of the noise signal included in the current frame is a coherent noise signal type, perform S403. If the signal type of the noise signal included in the current frame is a diffuse noise signal type, perform S404.

In a noisy environment, different noise signal types have different impact on a generalized cross-correlation algorithm. Therefore, to make full use of performance of generalized cross-correlation algorithms and improve ITD estimation precision, an audio coding apparatus may determine a signal type of a noise signal included in the current frame, and determine, from a plurality of frequency domain weighting functions, an appropriate frequency domain weighting function for the current frame.

In actual application, the foregoing coherent noise signal type refers to a type of noise signals with correlation between the noise signals in two audio signals of a stereo audio signal higher than a certain degree, that is, the noise signal included in the current frame may be classified as a coherent noise signal. The foregoing diffuse noise signal type refers to a type of noise signals with correlation between the noise signals in two audio signals of a stereo audio signal lower than a certain degree, that is, the noise signal included in the current frame may be classified as a diffuse noise signal.

In some possible implementations, the current frame may include both a coherent noise signal and a diffuse noise signal. In this case, the audio coding apparatus determines a signal type of a main noise signal in the two types of noise signals as the signal type of the noise signal included in the current frame.

In some possible implementations, the audio coding apparatus may determine, by calculating a noise coherence value of the current frame, the signal type of the noise signal included in the current frame. In this case, S402 may include: obtaining a noise coherence value of the current frame. If the noise coherence value is greater than or equal to a preset threshold, it indicates that the noise signals included in the current frame have strong correlation, and the audio coding apparatus may determine that the signal type of the noise signal included in the current frame is a coherent noise signal type. If the noise coherence value is less than the preset threshold, it indicates that the noise signals included in the current frame have weak correlation, and the audio coding apparatus may determine that the signal type of the noise signal included in the current frame is a diffuse noise signal type.

Herein, the preset threshold of the noise coherence value is an empirical value, and may be set based on factors such as ITD estimation performance. For example, the preset threshold is set to 0.20, 0.25, or 0.30. Certainly, the preset threshold may alternatively be set to another proper value. This is not specifically limited in this embodiment of this application.

In actual application, after calculating the noise coherence value of the current frame, the audio coding apparatus may further perform smoothing processing on the noise coherence value, to reduce an error in estimating the noise coherence value and improve accuracy of noise type identifying.

S403: Estimate an ITD value between a left channel audio signal and a right channel audio signal by using a first algorithm.

Herein, the first algorithm may include weighting a frequency domain cross power spectrum of the current frame based on a first weighting function; and may further include performing peak detection on the weighted cross-correlation function, and estimating the ITD value of the current frame based on the peak value of the weighted cross-correlation function.

After determining, through S402, that the signal type of the noise signal included in the current frame is a coherent noise signal type, the audio coding apparatus may use the first algorithm to estimate the ITD value of the current frame. For example, the audio coding apparatus selects the first weighting function to weight the frequency domain cross power spectrum of the current frame, performs peak detection on the weighted cross-correlation function, and estimates the ITD value of the current frame based on the peak value of the weighted cross-correlation function.

In some possible embodiments, the first weighting function may be one or more weighting functions with better performance under a coherent noise condition in the frequency domain weighting functions and/or the improved frequency domain weighting functions in the foregoing one or more embodiments, for example, the frequency domain weighting function shown in the formula (3), and the improved frequency domain weighting function shown in the formulas (7) and (8).

Optionally, the first weighting function may be the first improved frequency domain weighting function described in the foregoing embodiment, for example, the improved frequency domain weighting function shown in the formulas (7) and (8).

S404: Estimate an ITD value between a left channel audio signal and a right channel audio signal by using a second algorithm.

Herein, the second algorithm may include weighting a frequency domain cross power spectrum of the current frame based on a second weighting function; and may further include performing peak detection on the weighted cross-correlation function, and estimating the ITD value of the current frame based on the peak value of the weighted cross-correlation function.

Correspondingly, after determining, through S402, that the signal type of the noise signal included in the current frame is a diffuse noise signal type, the audio coding apparatus may use the second algorithm to estimate the ITD value of the current frame. For example, the audio coding apparatus selects the second weighting function to weight the frequency domain cross power spectrum of the current frame, performs peak detection on the weighted cross-correlation function, and estimates the ITD value of the current frame based on the peak value of the weighted cross-correlation function.

In some possible embodiments, the second weighting function may be one or more weighting functions with better performance under a diffuse noise condition in the frequency domain weighting functions and/or the improved frequency domain weighting functions in the foregoing one or more embodiments, for example, the frequency domain weighting function shown in the formula (5), and the improved frequency domain weighting function shown in the formula (16).

Optionally, the second weighting function may be the second improved frequency domain weighting function described in the foregoing embodiment, that is, the improved frequency domain weighting function shown in the formula (16).

In some possible implementations, because the stereo audio signal includes both a speech signal and a noise signal, the signal type included in the current frame obtained through framing processing in S401 may be a speech signal or a noise signal. Therefore, to simplify processing and further improve ITD estimation precision, before S402, the method may further include: performing speech endpoint detection on the current frame to obtain a detection result. If the detection result indicates that the signal type of the current frame is a noise signal type, calculate the noise coherence value of the current frame. If the detection result indicates that the signal type of the current frame is a speech signal type, determine a noise coherence value of a previous frame of the current frame of the stereo audio signal as the noise coherence value of the current frame.

After obtaining the current frame, the audio coding apparatus may perform speech endpoint detection (voice activity detection, VAD) on the current frame to distinguish whether a main signal of the current frame is a speech signal or a noise signal. If it is detected that the current frame includes a noise signal, calculating a noise coherence value in S402 may mean directly calculating the noise coherence value of the current frame. If it is detected that the current frame includes a speech signal, calculating a noise coherence value in S402 may mean determining, a noise coherence value of a history frame, for example, the noise coherence value of the previous frame of the current frame, as the noise coherence value of the current frame. Herein, the previous frame of the current frame may include a noise signal or a speech signal. If the previous frame still includes a speech signal, a noise coherence value of a previous noise frame in history frames is determined as the noise coherence value of the current frame.

In a specific implementation process, the audio coding apparatus may use a plurality of methods to perform VAD. When a value of VAD is 1, it indicates that the signal type of the current frame is a speech signal type. When the value of VAD is 0, it indicates that the signal type of the current frame is a noise signal type.

It should be noted that, in this embodiment of this application, the audio coding apparatus may calculate the value of VAD in time domain, frequency domain, or a combination of time domain and frequency domain. This is not specifically limited herein.

The following describes the stereo audio signal delay estimation method shown in FIG. 4 by using a specific example.

Figure 5:
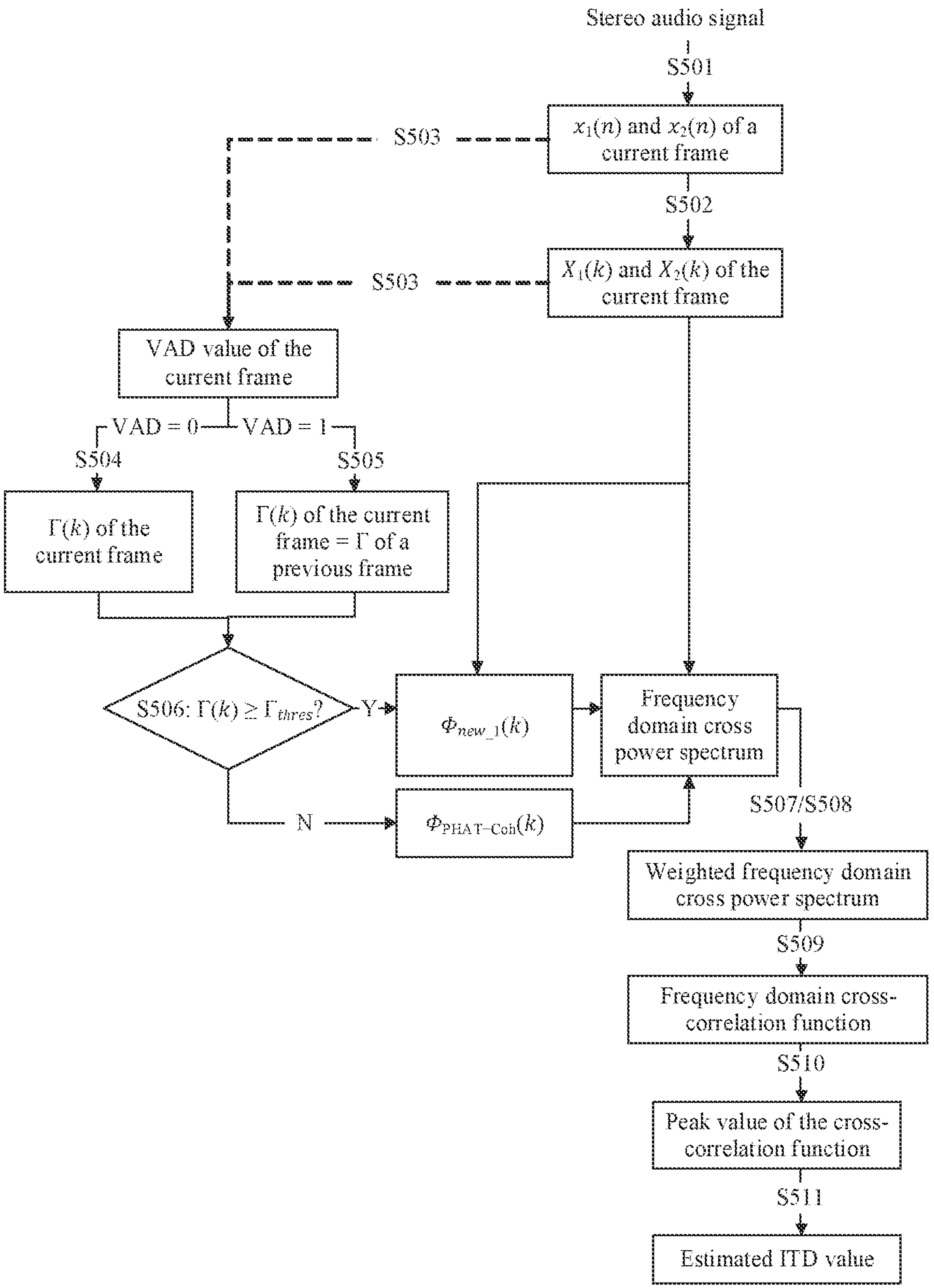
FIG. 5 is a schematic flowchart 3 of a stereo audio signal delay estimation method according to an embodiment of this application.

FIG. 5 is a schematic flowchart 3 of a stereo audio signal delay estimation method according to an embodiment of this application. The method may include the following steps.

S501: Perform framing processing on a stereo audio signal to obtain $x_1(n)$ and $x_2(n)$ of a current frame.

S502: Perform DFT on $x_1(n)$ and $x_2(n)$ to obtain $X_1(k)$ and $X_2(k)$ of the current frame.

S503: Calculate a VAD value of the current frame based on $x_1(n)$ and $x_2(n)$ or $X_1(k)$ and $X_2(k)$ of the current frame. If VAD=1, perform S504. If VAD=0, perform S505.

Herein, refer to dashed lines in FIG. 5. S503 may be performed after S501, or may be performed after S502. This is not specifically limited herein.

S504: Calculate a noise coherence value $\Gamma(k)$ of the current frame based on $X_1(k)$ and $X_2(k)$.

S505: Determine $\Gamma_{m-1}(k)$ of a previous frame as $\Gamma(k)$ of the current frame.

Herein, $\Gamma(k)$ of the current frame may also be expressed as $\Gamma_m(k)$, that is, a noise coherence value of an $m^{th}$ frame, where m is a positive integer.

S506: Compare $\Gamma(k)$ of the current frame with a preset threshold $\Gamma_{thres}$. If $\Gamma(k)$ is greater than or equal to $\Gamma_{thres}$, perform S507. If $\Gamma(k)$ is less than $\Gamma_{thres}$, perform S508.

S507: Weight $C_{x1x2}(k)$ of the current frame by using $\Phi_{new\_1}(k)$. In this case, the weighted frequency domain cross power spectrum may be expressed as $\Phi_{new\_1}(k)C_{x1x2}(k)$.

S508: Weight $C_{x1x2}$ (k) of the current frame by using $\Phi_{PHAT\text{-}Coh}(k)$. In this case, the weighted frequency domain cross power spectrum may be expressed as $\Phi_{PHAT\text{-}Coh}(k)$ $C_{x1x2}(k)$.

In actual application, after S506, before determining to perform S507, $C_{x1x2}(k)$ and $\Phi_{new\_1}(k)$ of the current frame may be calculated by using $X_1(k)$ and $X_2(k)$ of the current frame. Before determining to perform S508, $C_{x1x2}$ (k) and $\Phi_{PHAT\text{-}Coh}(k)$ of the current frame may be calculated by using $X_1(k)$ and $X_2(k)$ of the current frame

S509: Perform IDFT on $\Phi_{new\_1}(k)C_{x1x2}(k)$ or $\Phi_{PHAT\text{-}Coh}(k)C_{x1x2}(k)$ to obtain a cross-correlation function $G_{x1x2}(n)$.

$G_{x1x2}(n)$ may be shown in the formula (6) or (9).

S510: Perform peak detection on $G_{x1x2}(n)$.

S511: Calculate an estimated ITD value of the current frame based on a peak value of $G_{x1x2}(n)$.

In this way, the ITD estimation process for the stereo audio signal is completed.

In some possible implementations, in addition to the parametric stereo encoding and decoding technology, the foregoing ITD estimation method may also be applied to technologies such as sound source localization, voice enhancement, and voice separation.

It can be learned from the foregoing that, in this embodiment of this application, the audio coding apparatus uses different ITD estimation algorithms for a current frame including different types of noise, greatly improving ITD estimation precision and stability of a stereo audio signal in a case of diffuse noise and coherent noise, reducing inter-frame discontinuity between stereo downmixed signals, and better maintaining a phase of the stereo signal. A sound image of an encoded stereo is more accurate and stable, and has a stronger sense of reality, and auditory quality of the encoded stereo signal is improved.

Figure 6:
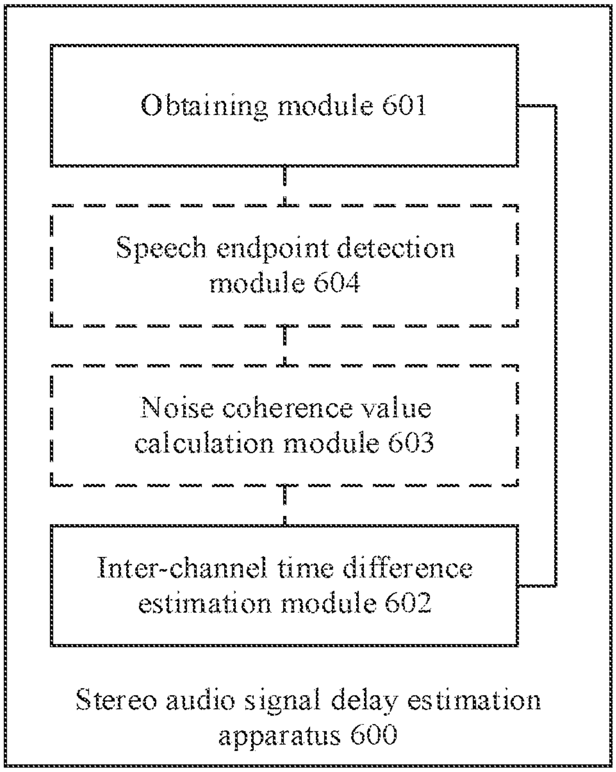
FIG. 6 is a schematic diagram depicting a structure of a stereo audio signal delay estimation apparatus according to an embodiment of this application.

Based on a same concept, an embodiment of this application provides a stereo audio signal delay estimation apparatus. The apparatus may be a chip or a system on chip in an audio coding apparatus, or may be a functional module that is in the audio coding apparatus and that is configured to implement the stereo audio signal delay estimation method shown in FIG. 4 in the foregoing embodiment and any possible implementation of the method. For example, FIG. 6 is a schematic diagram depicting a structure of an audio decoding apparatus according to an embodiment of this application. As shown by solid lines in FIG. 6, the stereo audio signal delay estimation apparatus 600 includes: an obtaining module 601 configured to obtain a current frame of a stereo audio signal, where the current frame includes a first channel audio signal and a second channel audio signal; and an inter-channel time difference estimation module 602 configured to: if a signal type of a noise signal included in the current frame is a coherent noise signal type, estimate an inter-channel time difference between the first channel audio signal and the second channel audio signal by using a first algorithm; or if a signal type of a noise signal included in the current frame is a diffuse noise signal type, estimate an inter-channel time difference between the first channel audio signal and the second channel audio signal by using a second algorithm. The first algorithm includes weighting a frequency domain cross power spectrum of the current frame based on a first weighting function, the second algorithm includes weighting a frequency domain cross power spectrum of the current frame based on a second weighting function, and a construction factor of the first weighting function is different from that of the second weighting function.

In this embodiment of this application, the current frame of the stereo signal obtained by the obtaining module 601 may be a frequency domain audio signal or a time domain audio signal. If the current frame is a frequency domain audio signal, the obtaining module 601 transfers the current frame to the inter-channel time difference estimation module 602, and the inter-channel time difference estimation module 602 may directly process the current frame in frequency domain. If the current frame is a time domain audio signal, the obtaining module 601 may first perform time-frequency transform on the current frame in time domain to obtain a current frame in frequency domain, and then the obtaining module 601 transfers the current frame in frequency domain to the inter-channel time difference estimation module 602. The inter-channel time difference estimation module 602 may process the current frame in frequency domain.

In some possible implementations, refer to a dashed line in FIG. 6. The apparatus further includes: a noise coherence value calculation module 603 configured to: obtain a noise coherence value of the current frame after the obtaining module 601 obtains the current frame; and if the noise coherence value is greater than or equal to a preset threshold, determine that the signal type of the noise signal included in the current frame is a coherent noise signal type; or if the noise coherence value is less than a preset threshold, determine that the signal type of the noise signal included in the current frame is a diffuse noise signal type.

In some possible implementations, refer to a dashed line in FIG. 6. The apparatus further includes: a speech endpoint detection module 604 configured to perform speech endpoint detection on the current frame, to obtain a detection result. The noise coherence value calculation module 603 is further configured to: if the detection result indicates that a signal type of the current frame is a noise signal type, calculate the noise coherence value of the current frame; or if the detection result indicates that a signal type of the current frame is a speech signal type, determine a noise coherence value of a previous frame of the current frame of the stereo audio signal as the noise coherence value of the current frame.

In this embodiment of this application, the speech endpoint detection module 604 may calculate a VAD value in time domain, frequency domain, or a combination of time domain and frequency domain. This is not specifically limited herein. The obtaining module 601 may transfer the current frame to the speech endpoint detection module 604 for VAD on the current frame.

In some possible implementations, the first channel audio signal is a first channel time domain signal, and the second channel audio signal is a second channel time domain signal. The inter-channel time difference estimation module 602 is configured to: perform time-frequency transform on the first channel time domain signal and the second channel time domain signal, to obtain a first channel frequency domain signal and a second channel frequency domain signal; calculate the frequency domain cross power spectrum of the current frame based on the first channel frequency domain signal and the second channel frequency domain signal; weight the frequency domain cross power spectrum based on the first weighting function; and obtain an estimated value of the inter-channel time difference based on a weighted frequency domain cross power spectrum. The construction factor of the first weighting function includes: a Wiener gain factor corresponding to the first channel frequency domain signal, a Wiener gain factor corresponding to the second channel frequency domain signal, an amplitude weighting parameter, and a squared coherence value of the current frame.

In some possible implementations, the first channel audio signal is a first channel frequency domain signal, and the second channel audio signal is a second channel frequency domain signal. The inter-channel time difference estimation module 602 is configured to: calculate the frequency domain cross power spectrum of the current frame based on the first channel frequency domain signal and the second channel frequency domain signal; weight the frequency domain cross power spectrum based on the first weighting function; and obtain an estimated value of the inter-channel time difference based on a weighted frequency domain cross power spectrum. The construction factor of the first weighting function includes: a Wiener gain factor corresponding to the first channel frequency domain signal, a Wiener gain factor corresponding to the second channel frequency domain signal, an amplitude weighting parameter, and a squared coherence value of the current frame.

In some possible implementations, the first weighting function $\Phi_{new\_1}(k)$ satisfies the foregoing formula (7).

In some other possible implementations, the first weighting function $\Phi_{new\_1}(k)$ satisfies the foregoing formula (8).

In some possible implementations, the Wiener gain factor corresponding to the first channel frequency domain signal is a first initial Wiener gain factor of the first channel frequency domain signal, and the Wiener gain factor corresponding to the second channel frequency domain signal is a second initial Wiener gain factor of the second channel frequency domain signal. The inter-channel time difference estimation module 602 is further configured to: obtain an estimated value of a first channel noise power spectrum based on the first channel frequency domain signal after the obtaining module obtains the current frame; determine the first initial Wiener gain factor based on the estimated value of the first channel noise power spectrum; obtain an estimated value of a second channel noise power spectrum based on the second channel frequency domain signal; and determine the second initial Wiener gain factor based on the estimated value of the second channel noise power spectrum.

In some possible implementations, the first initial Wiener gain factor $W_{x1}^{A}(k)$ satisfies the foregoing formula (10), and the second initial Wiener gain factor $W_{x2}^{A}(k)$ satisfies the foregoing formula (11).

In some possible implementations, the Wiener gain factor corresponding to the first channel frequency domain signal is a first improved Wiener gain factor of the first channel frequency domain signal, and the Wiener gain factor corresponding to the second channel frequency domain signal is a second improved Wiener gain factor of the second channel frequency domain signal. The inter-channel time difference estimation module 602 is further configured to: obtain the first initial Wiener gain factor and the second initial Wiener gain factor after the obtaining module obtains the current frame; construct a binary masking function for the first initial Wiener gain factor, to obtain the first improved Wiener gain factor; and construct a binary masking function for the second initial Wiener gain factor, to obtain the second improved Wiener gain factor.

In some possible implementations, the first improved Wiener gain factor $W_{x1}^{B}(k)$ satisfies the foregoing formula (12), and the second improved Wiener gain factor $W_{x2}^{B}(k)$ satisfies the foregoing formula (13).

In some possible implementations, the first channel audio signal is a first channel time domain signal, and the second channel audio signal is a second channel time domain signal. The inter-channel time difference estimation module 602 is further configured to: perform time-frequency transform on the first channel time domain signal and the second channel time domain signal, to obtain a first channel frequency domain signal and a second channel frequency domain signal; calculate the frequency domain cross power spectrum of the current frame based on the first channel frequency domain signal and the second channel frequency domain signal; weight the frequency domain cross power spectrum based on the second weighting function, to obtain an estimated value of the inter-channel time difference. The construction factor of the second weighting function includes an amplitude weighting parameter and a squared coherence value of the current frame.

In some possible implementations, the first channel audio signal is a first channel frequency domain signal, and the second channel audio signal is a second channel frequency domain signal. The inter-channel time difference estimation module 602 is further configured to: calculate the frequency domain cross power spectrum of the current frame based on the first channel frequency domain signal and the second channel frequency domain signal; weight the frequency domain cross power spectrum based on the second weighting function; and obtain an estimated value of the inter-channel time difference based on a weighted frequency domain cross power spectrum. The construction factor of the second weighting function includes an amplitude weighting parameter and a squared coherence value of the current frame.

In some possible implementations, the second weighting function $\Phi_{new\_2}(k)$ satisfies the foregoing formula (16).

It should be noted that, for specific implementation processes of the obtaining module 601, the inter-channel time difference estimation module 602, the noise coherence value calculation module 603, and the speech endpoint detection module 604, reference may be made to the detailed descriptions of the embodiments in FIG. 4 to FIG. 5. For brevity of the specification, details are not described herein again.

The obtaining module 601 mentioned in this embodiment of this application may be a receiving interface, a receiving circuit, a receiver, or the like. The inter-channel time difference estimation module 602, the noise coherence value calculation module 603, and the speech endpoint detection module 604 may be one or more processors.

Based on a same concept, an embodiment of this application provides a stereo audio signal delay estimation apparatus. The apparatus may be a chip or a system on chip in an audio coding apparatus, or may be a functional module that is in the audio coding apparatus and that is configured to implement the stereo audio signal delay estimation method shown in FIG. 3 and any possible implementation of the method. For example, still refer to FIG. 6. The stereo audio signal delay estimation apparatus 600 includes: an obtaining module 601 configured to obtain a current frame of a stereo audio signal, where the current frame includes a first channel audio signal and a second channel audio signal; and an inter-channel time difference estimation module 602 configured to: calculate a frequency domain cross power spectrum of the current frame based on the first channel audio signal and the second channel audio signal; weight the frequency domain cross power spectrum based on a preset weighting function; and obtain an estimated value of an inter-channel time difference between a first channel frequency domain signal and a second channel frequency domain signal based on a weighted frequency domain cross power spectrum.

The preset weighting function is a first weighting function or a second weighting function, and a construction factor of the first weighting function is different from that of the second weighting function. The construction factor of the first weighting function includes: a Wiener gain factor corresponding to the first channel frequency domain signal, a Wiener gain corresponding to the second channel frequency domain signal, an amplitude weighting parameter, and a squared coherence value of the current frame. The construction factor of the second weighting function includes: an amplitude weighting parameter and a squared coherence value of the current frame.

In some possible implementations, the first channel audio signal is a first channel time domain signal, and the second channel audio signal is a second channel time domain signal. The inter-channel time difference estimation module 602 is configured to: perform time-frequency transform on the first channel time domain signal and the second channel time domain signal, to obtain a first channel frequency domain signal and a second channel frequency domain signal; and calculate the frequency domain cross power spectrum of the current frame based on the first channel frequency domain signal and the second channel frequency domain signal.

In some possible implementations, the first channel audio signal is a first channel frequency domain signal, and the second channel audio signal is a second channel frequency domain signal. In this case, the frequency domain cross power spectrum of the current frame may be calculated directly based on the first channel audio signal and the second channel audio signal.

In some possible implementations, the first weighting function $\Phi_{new\_1}(k)$ satisfies the foregoing formula (7).

In some other possible implementations, the first weighting function $\Phi_{new\_1}(k)$ satisfies the foregoing formula (8).

In some possible implementations, the Wiener gain factor corresponding to the first channel frequency domain signal is a first initial Wiener gain factor of the first channel frequency domain signal, and the Wiener gain factor corresponding to the second channel frequency domain signal is a second initial Wiener gain factor of the second channel frequency domain signal. The inter-channel time difference estimation module 602 is further configured to: obtain an estimated value of a first channel noise power spectrum based on the first channel frequency domain signal after the obtaining module 601 obtains the current frame; determine the first initial Wiener gain factor based on the estimated value of the first channel noise power spectrum; obtain an estimated value of a second channel noise power spectrum based on the second channel frequency domain signal; and determine the second initial Wiener gain factor based on the estimated value of the second channel noise power spectrum.

In some possible implementations, the first initial Wiener gain factor $W_{x1}{}^{A}(k)$ satisfies the foregoing formula (10), and the second initial Wiener gain factor $W_{x2}{}^{A}(k)$ satisfies the foregoing formula (11).

In some possible implementations, the Wiener gain factor corresponding to the first channel frequency domain signal is a first improved Wiener gain factor of the first channel frequency domain signal, and the Wiener gain factor corresponding to the second channel frequency domain signal is a second improved Wiener gain factor of the second channel frequency domain signal. The inter-channel time difference estimation module 602 is further configured to: obtain the first initial Wiener gain factor and the second initial Wiener gain factor after the obtaining module 601 obtains the current frame; construct a binary masking function for the first initial Wiener gain factor, to obtain the first improved Wiener gain factor; and construct a binary masking function for the second initial Wiener gain factor, to obtain the second improved Wiener gain factor.

In some possible implementations, the first improved Wiener gain factor $W_{x1}{}^{B}(k)$ satisfies the foregoing formula (12), and the second improved Wiener gain factor $$W^{B}_{\substack{x2\\x1}}(k)$$

satisfies the foregoing formula (13).

In some possible implementations, the second weighting function $\Phi_{new\_2}(k)$ satisfies the foregoing formula (16).

It should be noted that, for specific implementation processes of the obtaining module 601 and the inter-channel time difference estimation module 602, reference may be made to the detailed description of the embodiment in FIG. 3. For brevity of the specification, details are not described herein again.

The obtaining module 601 mentioned in this embodiment of this application may be a receiving interface, a receiving circuit, a receiver, or the like. The inter-channel time difference estimation module 602 may be one or more processors.

Figure 7:
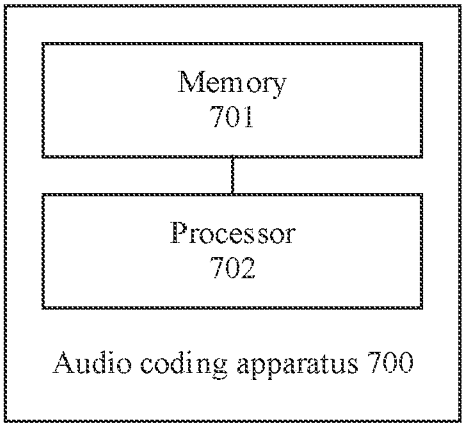
FIG. 7 is a schematic diagram depicting a structure of an audio coding apparatus according to an embodiment of this application.

Based on a same concept, an embodiment of this application provides an audio coding apparatus. The audio coding apparatus is consistent with the audio coding apparatus in the foregoing embodiments. FIG. 7 is a schematic diagram depicting a structure of an audio coding apparatus according to an embodiment of this application. Refer to FIG. 7. The audio coding apparatus 700 includes a non-volatile memory 701 and a processor 702 that are coupled to each other. The processor 702 invokes program code stored in the memory 701 to perform operation steps of the stereo audio signal delay estimation method in FIG. 3 to FIG. 5 and any possible implementation of the method.

In some possible implementations, the audio coding apparatus may specifically be a stereo coding apparatus. The apparatus may constitute an independent stereo coder; or may be a core coding part of a multi-channel coder, to encode a stereo audio signal formed by two audio signals generated by combining a plurality of signals in a multi-channel frequency domain signal.

In actual application, the audio coding apparatus may be implemented by using a programmable device such as an application-specific integrated circuit (ASIC), a register transfer layer circuit (RTL), or a field-programmable gate array (FPGA). Certainly, the audio coding apparatus may also be implemented by using another programmable device. This is not specifically limited in this embodiment of this application.

Based on a same concept, an embodiment of this application provides a computer-readable storage medium. The computer-readable storage medium stores instructions, and when the instructions are run on a computer, the operation steps of the stereo audio signal delay estimation method in FIG. 3 to FIG. 5 and any possible implementation of the method are performed.

Based on a same concept, an embodiment of this application provides a computer-readable storage medium, including an encoded bitstream. The encoded bitstream includes an inter-channel time difference of a stereo audio signal obtained according to the stereo audio signal delay estimation method in FIG. 3 to FIG. 5 and any possible implementation of the method.

Based on a same concept, an embodiment of this application provides a computer program or a computer program product. When the computer program or the computer program product is executed on a computer, the computer is enabled to implement the operation steps of the stereo audio signal delay estimation method in FIG. 3 to FIG. 5 and any possible implementation of the method.

A person skilled in the art can appreciate that functions described with reference to various illustrative logical blocks, modules, and algorithm steps disclosed and described herein may be implemented by hardware, software, firmware, or any combination thereof. If implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communication medium that facilitates transmission of a computer program from one place to another (for example, according to a communication protocol). In this manner, the computer-readable medium may generally correspond to: (1) a non-transitory tangible computer-readable storage medium, or (2) a communication medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example and not limitation, such computer-readable storage media may include a random-access memory (RAM), a read-only memory (ROM), an electrically erasable programmable read-only memory (EEPROM), a (compact disc read-only memory) CD-ROM or another optical disc storage apparatus, a magnetic disk storage apparatus or another magnetic storage apparatus, a flash memory, or any other medium that can store program code in a form of instructions or data structures and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically by using lasers. Combinations of the above should also be included within the scope of the computer-readable medium.

An instruction may be executed by one or more processors such as one or more digital signal processors (DSP), a general microprocessor, an ASIC, a FPGA, or an equivalent integrated or discrete logic circuit. Therefore, the term "processor" used in this specification may refer to the foregoing structure, or any other structure that may be applied to implementation of the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of apparatuses configured to perform the disclosed technologies, but the functions do not need to be implemented by different hardware units. Actually, as described above, various units may be combined into a codec hardware unit in combination with appropriate software and/or firmware, or may be provided by interoperable hardware units (including the one or more processors described above).

In the foregoing embodiments, the description of each embodiment has respective focuses. For a part that is not described in detail in an embodiment, refer to related descriptions in other embodiments.

The foregoing descriptions are merely specific example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:

obtaining a current frame of a stereo audio signal, wherein the current frame comprises a first channel audio signal, a second channel audio signal, and a noise signal; and estimating an inter-channel time difference between the first channel audio signal and the second channel audio signal using a first algorithm when a first signal type of the noise signal is a coherent noise signal type or using a second algorithm when the first signal type is a diffuse noise signal type, wherein the first algorithm comprises weighting a frequency domain cross power spectrum of the current frame based on a first weighting function comprising a first construction factor, wherein the second algorithm comprises weighting the frequency domain cross power spectrum based on a second weighting function comprising a second construction factor different from the first construction factor, and wherein estimating the inter-channel time difference using the first algorithm comprises:

obtaining a first channel frequency domain signal and a second channel frequency domain signal;

calculating the frequency domain cross power spectrum based on the first channel frequency domain signal and the second channel frequency domain signal;

weighting the frequency domain cross power spectrum based on the first weighting function to obtain a weighted frequency domain cross power spectrum; and obtaining a first estimated value of the inter-channel time difference based on the weighted frequency domain cross power spectrum, and wherein the first construction factor comprises: a first Wiener gain factor corresponding to the first channel frequency domain signal, a second Wiener gain factor corresponding to the second channel frequency domain signal, an amplitude weighting parameter, and a squared coherence value of the current frame.

2. The method of claim 1, further comprising:

obtaining first noise coherence value of the current frame; and determining that the first signal type of the noise signal is one of the coherent noise signal type when the first noise coherence value is greater than or equal to a preset threshold, or that the first signal type of the noise signal is the diffuse noise signal type when the first noise coherence value is less than the preset threshold.

3. The method of claim 2, wherein obtaining the first noise coherence value of the current frame comprises:

performing speech endpoint detection on the current frame to determine a second signal type of the current frame; and calculating the first noise coherence value when a detection result indicates that the second signal type is a noise signal type, or determining a second noise coherence value of a previous frame of the current frame of the stereo audio signal as the first noise coherence value when the detection result indicates that the second signal type is a speech signal type.

4. The method of claim 1, wherein the first channel audio signal is a first channel time domain signal, wherein the second channel audio signal is a second channel time domain signal, and wherein obtaining the first channel frequency domain signal and the second channel frequency domain signal comprises performing time-frequency transform on the first channel time domain signal to obtain the first channel frequency domain signal and on the second channel time domain signal to obtain the second channel frequency domain signal.

5. The method of claim 1, wherein the first channel audio signal is the first channel frequency domain signal, and wherein the second channel audio signal is the second channel frequency domain signal.

6. The method of claim 4, wherein the first weighting function $\Phi_{new1}(k)$ satisfies one of the following formulas:

$$\Phi_{new\_1}(k) = \frac{W_{x1}(k)W_{x2}(k)}{|X_1(k)X_2^*(k)|^{\beta}} \times \frac{\Gamma^2(k)}{(1.0-\Gamma^2(k))}, \text{ or}$$

$$\Phi_{new\_1}(k) = \frac{W_{x1}(k)W_{x2}(k)}{|X_1(k)X_2^*(k)|^{\beta}} \times \Gamma^2(k),$$

wherein $\beta$ is the amplitude weighting parameter, $\beta \in [0,1]$, $W_{x1}(k)$ is the first Wiener gain factor corresponding to the first channel frequency domain signal, $W_{x2}(k)$ is the second Wiener gain factor corresponding to the second channel frequency domain signal, $X_1(k)$ is the first channel frequency domain signal, $X_2(k)$ is the second channel frequency domain signal, $X_2^*(k)$ is a conjugate function of $X_2(k)$, $\Gamma^2(k)$ is a squared coherence value of a $k^{th}$ frequency bin of the current frame, $$\Gamma^2(k) = \frac{|X_1(k)X_2^*(k)|^2}{|X_1(k)|^2|X_2(k)|^2},$$

k is a frequency bin index value, k=0, 1, . . . , $N_{DFT}-1$, and $N_{DFT}$ is a total quantity of frequency bins of the current frame after time-frequency transform.

7. The method of claim 4, wherein the first Wiener gain factor corresponding to the first channel frequency domain signal is a first initial Wiener gain factor of the first channel frequency domain signal, wherein the second Wiener gain factor corresponding to the second channel frequency domain signal is a second initial Wiener gain factor of the second channel frequency domain signal, and wherein after obtaining the current frame of the stereo audio signal, the method further comprises:

obtaining a second estimated value of a first channel noise power spectrum based on the first channel frequency domain signal;

determining the first initial Wiener gain factor based on the second estimated value;

obtaining a third estimated value of a second channel noise power spectrum based on the second channel frequency domain signal; and determining the second initial Wiener gain factor based on the third estimated value.

8. The method of claim 7, wherein the first initial Wiener gain factor $W_{x1}^A(k)$ satisfies the following formulas:

$$W_{x1}^A(k) = \frac{|X_1(k)|^2 - |\hat{N}_1(k)|^2}{|X_1(k)|^2},$$

wherein the second initial Wiener gain factor $W_{x2}^A(k)$ satisfies the following formula:

$$W_{x2}^A(k) = \frac{|X_2(k)|^2 - |\hat{N}_2(k)|^2}{|X_2(k)|^2},$$

wherein $|\hat{N}_1(k)|^2$ is the second estimated value of the first channel noise power spectrum, $|\hat{N}_2(k)|^2$ is the third estimated value of the second channel noise power spectrum, $X_1(k)$ is the first channel frequency domain signal, $X_2(k)$ is the second channel frequency domain signal, k is a frequency bin index value, k=0, 1, . . . , $N_{DFT}-1$, and $N_{DFT}$ is a total quantity of frequency bins of the current frame after time-frequency transform.

9. The method of claim 4, wherein the first Wiener gain factor corresponding to the first channel frequency domain signal is a first improved Wiener gain factor of the first channel frequency domain signal, wherein the second Wiener gain factor corresponding to the second channel frequency domain signal is a second improved Wiener gain factor of the second channel frequency domain signal, and wherein after obtaining the current frame of the stereo audio signal, the method further comprises:

obtaining a first initial Wiener gain factor of the first channel frequency domain signal and a second initial Wiener gain factor of the second channel frequency domain signal;

constructing a first binary masking function for the first initial Wiener gain factor to obtain the first improved Wiener gain factor; and constructing a second binary masking function for the second initial Wiener gain factor to obtain the second improved Wiener gain factor.

10. The method of claim 9, wherein the first improved Wiener gain factor $W_{x1}^{B}(k)$ satisfies the following formulas:

$$W_{x1}^{B}(k) = \begin{cases} 1 & \text{if } W_{x1}^{A}(k) \geq \mu_0 \\ 0 & \text{if } W_{x1}^{A}(k) < \mu_0 \end{cases},$$

wherein the second improved Wiener gain factor $$W_{\substack{x2\\x1}}^{B}(k)$$

satisfies the following formula:

$$W_{x2}^{B}(k) = \begin{cases} 1 & \text{if } W_{x2}^{A}(k) \geq \mu_0 \\ 0 & \text{if } W_{x2}^{A}(k) < \mu_0 \end{cases},$$

wherein $\mu_0$ is a binary masking threshold of the first Wiener gain factor and the second Wiener gain factor, $W_1^{A}(k)$ is the first initial Wiener gain factor, and $W_{x2}^{A}(k)$ is the second initial Wiener gain factor.

11. The method of claim 1, wherein the first channel audio signal is a first channel time domain signal, wherein the second channel audio signal is a second channel time domain signal, and wherein estimating the inter-channel time difference using the second algorithm comprises:

performing time-frequency transform on the first channel time domain signal to obtain a first channel frequency domain signal and on the second channel time domain signal to a second channel frequency domain signal;

calculating the frequency domain cross power spectrum based on the first channel frequency domain signal and the second channel frequency domain signal; and weighting the frequency domain cross power spectrum based on the second weighting function to obtain a first estimated value of the inter-channel time difference, and wherein the second construction factor comprises an amplitude weighting parameter and a squared coherence value of the current frame.

12. The method of claim 1, wherein the first channel audio signal is a first channel frequency domain signal, wherein the second channel audio signal is a second channel frequency domain signal; wherein estimating the inter-channel time difference using the second algorithm comprises:

calculating the frequency domain cross power spectrum based on the first channel frequency domain signal and the second channel frequency domain signal;

weighting the frequency domain cross power spectrum based on the second weighting function to obtain a weighted frequency domain cross power spectrum; and obtaining an estimated value of the inter-channel time difference based on the weighted frequency domain cross power spectrum, wherein the second construction factor comprises an amplitude weighting parameter and a squared coherence value of the current frame.

13. The method of claim 11, wherein the second weighting function $\Phi_{new2}(k)$ satisfies the following formula:

$$\Phi_{new\_2}(k) = \frac{1}{|X_1(k)X_2^*(k)|^{\beta}} \times \Gamma^2(k),$$

wherein β is the amplitude weighting parameter, β∈[0,1], $X_1(k)$ is the first channel frequency domain signal, $X_2(k)$ is the second channel frequency domain signal, $X_2^*(k)$ is a conjugate function of $X_2(k)$, $\Gamma^2(k)$ is a squared coherence value of a $k^{th}$ frequency bin of the current frame, $$\Gamma^2(k) = \frac{|X_1(k)X_2^*(k)|^2}{|X_1(k)|^2|X_2(k)|^2},$$

k is a frequency bin index value, k=0, 1, . . . , $N_{DFT}-1$, and $N_{DFT}$ is a total quantity of frequency bins of the current frame after time-frequency transform.

14. An apparatus, comprising:

a memory configured to store instructions; and a processor coupled to the memory and configured to execute the instructions to cause the apparatus to:

obtain a current frame of a stereo audio signal, wherein the current frame comprises a first channel audio signal, a second channel audio signal, and a noise signal; and estimate an inter-channel time difference between the first channel audio signal and the second channel audio signal using a first algorithm when a first signal type of the noise signal is a coherent noise signal type, or using a second algorithm when the first signal type is a diffuse noise signal type, wherein the first algorithm comprises weighting a frequency domain cross power spectrum of the current frame based on a first weighting function comprising a first construction factor, and wherein the second algorithm comprises weighting the frequency domain cross power spectrum based on a second weighting function comprising a second construction factor different from the first construction factor, and wherein executing the instructions to cause the apparatus to estimate the inter-channel time difference using the first algorithm further causes the apparatus to:

obtain a first channel frequency domain signal and a second channel frequency domain signal;

calculate the frequency domain cross power spectrum based on the first channel frequency domain signal and the second channel frequency domain signal;

weight the frequency domain cross power spectrum based on the first weighting function to obtain a weighted frequency domain cross power spectrum; and obtain a first estimated value of the inter-channel time difference based on the weighted frequency domain cross power spectrum, and wherein the first construction factor comprises: a first Wiener gain factor corresponding to the first channel frequency domain signal, a second Wiener gain factor corresponding to the second channel frequency domain signal, an amplitude weighting parameter, and a squared coherence value of the current frame.

15. The apparatus of claim 14, wherein the processor is further configured to execute the instructions to cause the apparatus to:

obtain a first noise coherence value of the current frame; and determine that the first signal type of the noise signal is one of the coherent noise signal type when the first noise coherence value is greater than or equal to a preset threshold, or that the first signal type of the noise signal is the diffuse noise signal type when the first noise coherence value is less than the preset threshold.

16. The apparatus of claim 15, wherein the processor is further configured to execute the instructions to cause the apparatus to:

perform speech endpoint detection on the current frame to determine a second signal type of the current frame; and calculate the first noise coherence value of the current frame when a detection result indicates that the second signal type is a noise signal type, or determine a second noise coherence value of a previous frame of the current frame of the stereo audio signal as the first noise coherence value when the detection result indicates that the second signal type is a speech signal type.

17. The apparatus of claim 14, wherein the first channel audio signal is a first channel time domain signal, and the second channel audio signal is a second channel time domain signal; and wherein the processor is further configured to execute the instructions to cause the apparatus to: perform time-frequency transform on the first channel time domain signal to obtain a first channel frequency domain signal and on the second channel time domain signal to obtain a second channel frequency domain signal.

18. The apparatus of claim 14, wherein the first channel audio signal is the first channel frequency domain signal, and the second channel audio signal is the second channel frequency domain signal.

19. The apparatus of claim 17, wherein the first weighting function $\Phi_{new1}(k)$ satisfies one of the following formula:

$$\Phi_{new\_1}(k) = \frac{W_{x1}(k)W_{x2}(k)}{|X_1(k)X_2^*(k)|^{\beta}} \times \frac{\Gamma^2(k)}{(1.0 - \Gamma^2(k))}, \text{ or}$$

-continued $$\Phi_{new\_1}(k) = \frac{W_{x1}(k)W_{x2}(k)}{|X_1(k)X_2^*(k)|^{\beta}} \times \Gamma^2(k),$$

wherein β is the amplitude weighting parameter, β∈[0,1], $W_{x1}(k)$ is the first Wiener gain factor corresponding to the first channel frequency domain signal, $W_{x2}(k)$ is the second Wiener gain factor corresponding to the second channel frequency domain signal, $X_1(k)$ is the first channel frequency domain signal, $X_2(k)$ is the second channel frequency domain signal, $X_2^*(k)$ is a conjugate function of $X_2(k)$, $\Gamma^2(k)$ is a squared coherence value of a $k^{th}$ frequency bin of the current frame, $$\Gamma^2(k) = \frac{|X_1(k)X_2^*(k)|^2}{|X_1(k)|^2|X_2(k)|^2},$$

k is a frequency bin index value, k=0, 1, . . . , $N_{DFT}-1$, and $N_{DFT}$ is a total quantity of frequency bins of the current frame after time-frequency transform.

20. The apparatus of claim 17, wherein the first Wiener gain factor corresponding to the first channel frequency domain signal is a first initial Wiener gain factor of the first channel frequency domain signal, and the second Wiener gain factor corresponding to the second channel frequency domain signal is a second initial Wiener gain factor of the second channel frequency domain signal, and wherein the processor is further configured to execute the instructions to cause the apparatus to:

obtain a second estimated value of a first channel noise power spectrum based on the first channel frequency domain signal, and determining the first initial Wiener gain factor based on the second estimated value; and obtain a third estimated value of a second channel noise power spectrum based on the second channel frequency domain signal, and determining the second initial Wiener gain factor based on the third estimated value.

21. The apparatus of claim 20, wherein the first initial Wiener gain factor $W_{x1}{}^{A}(k)$ satisfies the following formula:

$$W_{x1}^{A}(k) = \frac{|X_1(k)|^2 - |\hat{N}_1(k)|^2}{|X_1(k)|^2},$$

wherein the second initial Wiener gain factor $W_{x2}{}^{A}(k)$ satisfies the following formula:

$$W_{x2}^{A}(k) = \frac{|X_2(k)|^2 - |\hat{N}_2(k)|^2}{|X_2(k)|^2},$$

wherein $|\hat{N}_1(k)|^2$ is the second estimated value of the first channel noise power spectrum, $|\hat{N}_2(k)|^2$ is the third estimated value of the second channel noise power spectrum, $X_1(k)$ is the first channel frequency domain signal, $X_2(k)$ is the second channel frequency domain signal, k is a frequency bin index value, k=0, 1, . . . , $N_{DFT}-1$, and $N_{DFT}$ is a total quantity of frequency bins of the current frame after time-frequency transform.

22. The apparatus of claim 17, wherein the first Wiener gain factor corresponding to the first channel frequency domain signal is a first improved Wiener gain factor of the first channel frequency domain signal, and the second Wiener gain factor corresponding to the second channel frequency domain signal is a second improved Wiener gain factor of the second channel frequency domain signal, and wherein the processor is further configured to execute the instructions to cause the apparatus to:

obtain a first initial Wiener gain factor of the first channel frequency domain signal and a second initial Wiener gain factor of the second channel frequency domain signal;

construct a first binary masking function for the first initial Wiener gain factor to obtain the first improved Wiener gain factor; and construct a second binary masking function for the second initial Wiener gain factor to obtain the second improved Wiener gain factor.

23. The apparatus of claim 22, wherein the first improved Wiener gain factor $W_{x1}^{B}(k)$ satisfies the following formula:

$$W_{x1}^{B}(k) = \begin{cases} 1 & \text{if } W_{x1}^{A}(k) \geq \mu_0 \\ 0 & \text{if } W_{x1}^{A}(k) < \mu_0 \end{cases},$$

wherein the second improved Wiener gain factor $$W^{B}_{\substack{x2\\x1}}(k)$$

satisfies the following formula:

$$W_{x2}^{B}(k) = \begin{cases} 1 & \text{if } W_{x2}^{A}(k) \geq \mu_0 \\ 0 & \text{if } W_{x2}^{A}(k) < \mu_0 \end{cases},$$

wherein $\mu_0$ is a binary masking threshold of the first Wiener gain factor and the second Wiener gain factor, $W_{x1}^{A}(k)$ is the first initial Wiener gain factor, and $W_{x2}^{A}(k)$ is the second initial Wiener gain factor.

24. The apparatus of claim 14, wherein the first channel audio signal is a first channel time domain signal, the second channel audio signal is a second channel time domain signal, and wherein the processor is further configured to execute the instructions to cause the apparatus to:

perform time-frequency transform on the first channel time domain signal to obtain a first channel frequency domain signal and on the second channel time domain signal to a second channel frequency domain signal;

calculate the frequency domain cross power spectrum based on the first channel frequency domain signal and the second channel frequency domain signal; and weight the frequency domain cross power spectrum based on the second weighting function to obtain a first estimated value of the inter-channel time difference, and wherein the second construction factor comprises an amplitude weighting parameter and a squared coherence value of the current frame.

25. The apparatus of claim 14, wherein the first channel audio signal is a first channel frequency domain signal, and the second channel audio signal is a second channel frequency domain signal; and wherein the processor is further configured to execute the instructions to cause the apparatus to:

calculate the frequency domain cross power spectrum based on the first channel frequency domain signal and the second channel frequency domain signal;

weight the frequency domain cross power spectrum based on the second weighting function to obtain a weighted frequency domain cross power spectrum; and obtain an estimated value of the inter-channel time difference based on the weighted frequency domain cross power spectrum, wherein the second construction factor comprises an amplitude weighting parameter and a squared coherence value of the current frame.

26. The apparatus of claim 24, wherein the second weighting function $\Phi_{new2}(k)$ satisfies the following formula:

$$\Phi_{new\_2}(k) = \frac{1}{|X_1(k)X_2^*(k)|^{\beta}} \times \Gamma^2(k),$$

wherein $\beta$ is the amplitude weighting parameter, $\beta \in [0,1]$, $X_1(k)$ is the first channel frequency domain signal, $X_2(k)$ is the second channel frequency domain signal, $X_2^*(k)$ is a conjugate function of $X_2(k)$, $\Gamma^2(k)$ is a squared coherence value of a $k^{th}$ frequency bin of the current frame, $$\Gamma^2(k) = \frac{|X_1(k)X_2^*(k)|^2}{|X_1(k)|^2|X_2(k)|^2},$$

k is the frequency bin index value, k=0, 1, . . . , $N_{DFT}-1$, and $N_{DFT}$ is a total quantity of frequency bins of the current frame after time-frequency transform.

27. A computer program product comprising computer-executable instructions stored on a non-transitory computer-readable storage medium, the computer-executable instructions when executed by a processor of an apparatus, cause the apparatus to:

obtain a current frame of a stereo audio signal, wherein the current frame comprises a first channel audio signal, a second channel audio signal, and a noise signal; and estimate an inter-channel time difference between the first channel audio signal and the second channel audio signal using one of a first algorithm when a first signal type of the noise signal is a coherent noise signal type, wherein the first algorithm comprises weighting a frequency domain cross power spectrum of the current frame based on a first weighting function comprising a first construction factor, or a second algorithm when the first signal type of the noise signal is a diffuse noise signal type, wherein the second algorithm comprises weighting the frequency domain cross power spectrum of the current frame based on a second weighting function comprising a second construction factor different from the first construction factor; and wherein the computer-executable instructions to estimate the inter-channel time difference using the first algorithm when executed by the processor, further cause the apparatus to:

obtain a first channel frequency domain signal and a second channel frequency domain signal;

calculate the frequency domain cross power spectrum based on the first channel frequency domain signal and the second channel frequency domain signal;

weight the frequency domain cross power spectrum based on the first weighting function to obtain a weighted frequency domain cross power spectrum; and obtain a first estimated value of the inter-channel time difference based on the weighted frequency domain cross power spectrum, and wherein the first construction factor comprises: a first Wiener gain factor corresponding to the first channel frequency domain signal, a second Wiener gain factor corresponding to the second channel frequency domain signal, an amplitude weighting parameter, and a squared coherence value of the current frame.

* * * * *